US009473552B2

(12) United States Patent
Amano

(10) Patent No.: US 9,473,552 B2
(45) Date of Patent: Oct. 18, 2016

(54) PREVENTING OMISSION OF DATA IN A REMOTE CONFERENCE

(71) Applicant: Brother Kogyo Kabushiki Kaisha, Nagoya-shi, Aichi-ken (JP)

(72) Inventor: Katsuhiro Amano, Toyota (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 149 days.

(21) Appl. No.: 14/553,312

(22) Filed: Nov. 25, 2014

(65) Prior Publication Data

US 2015/0154207 A1    Jun. 4, 2015

(30) Foreign Application Priority Data

Nov. 29, 2013   (JP) ................................ 2013-247617

(51) Int. Cl.
*G06F 17/00* (2006.01)
*H04L 29/06* (2006.01)
*H04N 7/15* (2006.01)
*H04L 29/08* (2006.01)

(52) U.S. Cl.
CPC ........... *H04L 65/80* (2013.01); *H04L 65/1083* (2013.01); *H04L 65/403* (2013.01); *H04N 7/15* (2013.01); *H04L 67/148* (2013.01); *H04L 69/04* (2013.01)

(58) Field of Classification Search
CPC ... H04L 67/148; H04L 67/322; H04L 69/14; H04L 69/04
See application file for complete search history.

(56) References Cited

U.S. PATENT DOCUMENTS

| 6,754,231 B1 * | 6/2004 | Jonsson | H04L 29/06 370/235 |
| 7,346,007 B2 | 3/2008 | Curcio et al. | |
| 8,091,838 B2 * | 1/2012 | Sun | G06F 1/187 248/221.11 |
| 8,351,327 B1 * | 1/2013 | Binns | H04L 67/322 370/229 |
| 2004/0057420 A1 | 3/2004 | Curcio et al. | |
| 2006/0053209 A1 * | 3/2006 | Li | H04L 29/06027 709/217 |
| 2007/0133436 A1 * | 6/2007 | Provino | H04L 29/06027 370/260 |
| 2008/0091838 A1 | 4/2008 | Miceli | |
| 2008/0158339 A1 * | 7/2008 | Civanlar | H04N 7/152 348/14.09 |

FOREIGN PATENT DOCUMENTS

| JP | 2000-349824 A | 12/2000 |
| JP | 2006-500808 A | 1/2006 |
| JP | 2008-099276 A | 4/2008 |
| WO | 0059166 A1 | 10/2000 |

* cited by examiner

*Primary Examiner* — Curtis Kuntz
*Assistant Examiner* — Thomas Maung
(74) *Attorney, Agent, or Firm* — Banner & Witcoff, Ltd.

(57) ABSTRACT

A non-transitory computer-readable medium stores computer-readable instructions that, when executed by a processor of a device, perform processes including a first generation operation generating first sound data, a storage operation storing the first sound data in a storage device, an acquisition operation acquiring a first value defined based on a storage amount, a determination operation determining whether the first value is larger than a threshold value, a setting operation setting a total time to a first total time in response to the determination operation determining that the first value is larger than the threshold value and to a second total time, which is shorter than the first total time, in response to the determination operation determining that the first value is not larger than the threshold value, and a second generation operation generating the second sound data from a specified number of pieces of the first sound data.

13 Claims, 11 Drawing Sheets

PREVENTING OMISSION OF DATA IN A REMOTE CONFERENCE

CROSS-REFERENCE TO RELATED APPLICATION

This application claims priority to Japanese Patent Application No. 2013-247617, filed on Nov. 29, 2013, the content of which is hereby incorporated herein by reference in its entirety.

BACKGROUND

The present disclosure relates to a non-transitory computer-readable medium and a device.

A system is known which includes a plurality of devices that are mutually connected via a network, and which enables an audio conference through transmission and reception of sound data between the devices. In an example of this kind of system, a terminal device may sequentially encode collected audio and generate audio data packets. The terminal device may send out the audio data packets to a communication channel at predetermined intervals (at 20 millisecond intervals, for example). The terminal device may sequentially store audio data packets that are received from another terminal device in a memory. The other terminal device may retrieve the stored audio data packets from the memory at the predetermined intervals, and decode the audio data packets to reproduce the audio.

Further, in another example of this kind of system, a client device may display a bandwidth of a communication channel through which streaming media is received from a server device. In a case where the bandwidth changes, the client device may transmit, to the server device, a request to adjust a communication bit rate of the streaming media. The server device may transmit, to the client device, the streaming media whose transmission bit rate has been adjusted in accordance with the request.

SUMMARY

In the example of the above-described system, if jitter occurs on the communication channel or the bandwidth varies, the terminal device on the receiving side may time out when receiving the audio data packet. In this case, the terminal device on the transmission side may perform re-transmission processing of the audio data packet that has timed out. The terminal device on the receiving side may reproduce the audio by decoding the audio data packets at the predetermined intervals. Therefore, if delays that have occurred when receiving the audio data packets are accumulated and become large, in order to eliminate the delays, an omission may occur in the audio to be reproduced.

In the other example of the above-described system, in a case where the accumulation of the delays is inhibited by the server device changing the transmission bit rate, the omission in the audio may be less likely to occur. However, when the server device changes the transmission bit rate, the server may need to initialize an encoder in order to change encoding conditions of the streaming media.

Various embodiments of the broad principles derived herein provide a non-transitory computer-readable medium and a device each capable of inhibiting an omission in audio to be reproduced, without changing encoding conditions of sound data that is transmitted and received via a network.

Various embodiments herein provide a non-transitory computer-readable medium storing computer-readable instructions. The instructions, when executed by a processor of a device configured to be connectable to a network, performs processes including a first generation operation generating first sound data by compressing, in accordance with a pre-set compression parameter, sound data acquired via a microphone connected to the device. The processes also include a storage operation storing the first sound data in an order of generation in a storage device of the device. The processes further include an acquisition operation acquiring a first value. The first value is defined based on a storage amount. The storage amount represents a total data amount of at least one piece of the first sound data stored in the storage device. The processes further include a determination operation determining whether the first value is larger than a threshold value. The processes further include a setting operation setting a total time to: a first total time in response to the determination operation determining that the first value is larger than the threshold value; and a second total time in response to the determination operation determining that the first value is not larger than the threshold value. The second total time is shorter than the first total time. The total time corresponds to a total reproduction time of second sound data to be transmitted to another device via the network. The other device is configured to be connectable to the network. The processes further include a second generation operation generating the second sound data from a specified number of pieces of the first sound data, the specified number of pieces of the first sound data being acquired from among the at least one piece of first sound data stored in the storage device. The specified number of pieces of the first sound data corresponds to the total time.

Various embodiments also provide a non-transitory computer-readable medium storing computer-readable instructions. The instructions, when executed by a processor of a device configured to be connectable to a network, perform processes including a first generation operation generating first sound data by compressing, in accordance with a pre-set compression parameter, sound data acquired via a microphone connected to the device. The processes also include a second generation operation generating second sound data from the first sound data having a time length corresponding to a total time. The total time corresponds to a total reproduction time of the second sound data to be transmitted to another device via the network. The other device is configured to be connectable to the network. The processes further include a storage operation storing the second sound data in a storage device of the device. The processes further include an acquisition operation acquiring a first value. The first value is defined based on a storage amount. The storage amount represents a data amount of the second sound data stored in the storage device. The processes further include a determination operation determining whether the first value is larger than a threshold value. The processes further include a setting operation setting the total time to: a first total time in response to the determination operation determining that the first value is larger than the threshold value; and a second total time in response to the determination operation determining that the first value is not larger than the threshold value. The second total time is shorter than the first total time.

Various embodiments further provide a device configured to be connectable to a network. The device includes a processor and a memory. The memory is configured to store computer-readable instructions. The instructions, when executed by the processor, perform processes including a first generation operation generating first sound data by compressing, in accordance with a pre-set compression parameter, sound data acquired via a microphone connected to the device. The processes also include a storage operation storing the first sound data in an order of generation in a storage device of the device. The processes further include an acquisition operation acquiring a first value. The first value is defined based on a storage amount. The storage amount represents a total data amount of at least one piece of the first sound data stored in the storage device. The processes further include a determination operation determining whether the first value is larger than a threshold value. The processes further include a setting operation setting a total time to: a first total time in response to the determination operation determining that the first value is larger than the threshold value; and a second total time in response to the determination operation determining that the first value is not larger than the threshold value. The second total time is shorter than the first total time. The total time corresponds to a total reproduction time of second sound data to be transmitted to another device via the network. The other device is configured to be connectable to the network. The processes further include a second generation operation generating the second sound data from a specified number of pieces of the first sound data, the specified number of pieces of the first sound data being acquired from among the at least one piece of first sound data stored in the storage device. The specified number of pieces of the first sound data correspond to the total time.

BRIEF DESCRIPTION OF THE DRAWINGS

Embodiments will be described below in detail with reference to the accompanying drawings in which.

DETAILED DESCRIPTION

Figure 1:
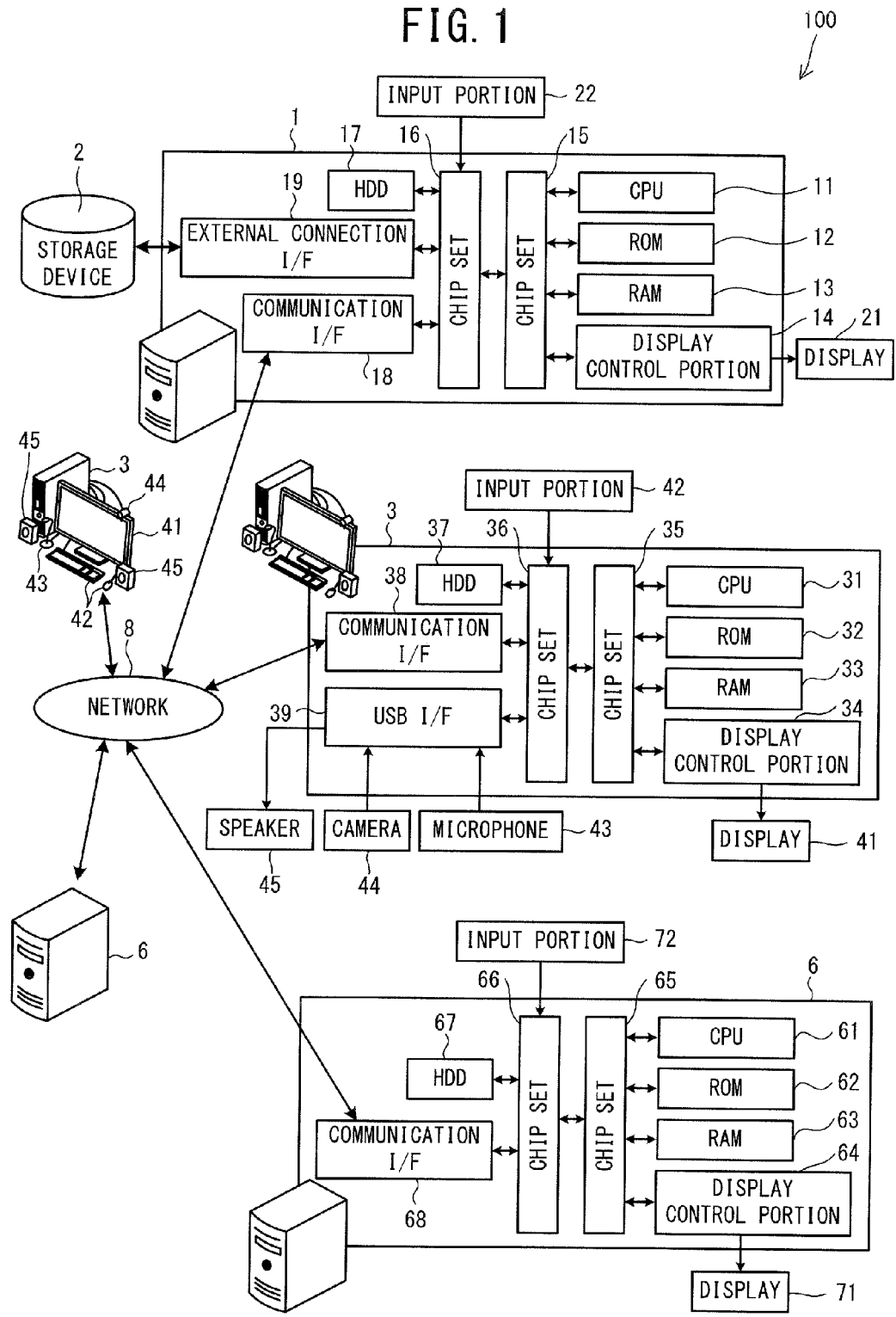
FIG. 1 is an overall configuration diagram of a conference system.

Hereinafter, embodiments will be explained with reference to the drawings. First, the configuration of a conference system 100 according to an embodiment will be explained with reference to FIG. 1. The conference system 100 at least includes a plurality of terminals 3 that are mutually connectable via a network 8. The present embodiment exemplifies the conference system 100 that includes a conference server 1, the plurality of terminals 3 and a plurality of relay servers 6 that are all mutually connectable via the network 8. The conference system 100 shown in FIG. 1 is a configuration example that includes one conference server 1, two terminals 3 and two relay servers 6 that are mutually connectable via the network 8. Although the configuration example shown in FIG. 1 is basically used in the explanation below, the respective numbers of the conference server 1, the terminals 3 and the relay servers 6 are not limited to the numbers shown in this example. For example, the number of the terminals 3 may be three or more. In the conference system 100, the plurality of terminals 3 can each virtually participate, via the network 8, in a conference room that is virtually constructed by the conference server 1 and can hold a remote conference (a video conference) that uses images and audio.

The conference server 1 may be constructed using, for example, a general-purpose work station or a personal computer having a known structure. The conference server 1 is configured to control a remote conference that is conducted between the plurality of terminals 3. The conference server 1 is configured to virtually construct a conference room in order for users of the plurality of terminals 3 that are connected to each other via the network 8 to conduct a remote conference that uses images and audio, and is also configured to manage entering and exiting the conference room by each user. The conference server 1 is configured to be connectable to a storage device 2. A database may be constructed in the storage device 2. Various types of setting information relating to the conference room, identification information of the conference room (hereinafter simply referred to as a conference room ID), respective network addresses of the terminals 3 and the relay servers 6, path information in data transmission and reception, and identification information that is unique to each of the terminals 3 (hereinafter simply referred to as a unique ID) may be associated with each other and stored in the database of the present embodiment. The unique ID may be issued by the conference server 1 to each of the terminals 3 that participate in a remote conference. Further, information that indicates a presence or an absence of a transmission buffer in each of the relay servers 6 may be stored in the storage device 2. Further, material data, such as documents or moving images, that are used in a remote conference by the users may be stored in the storage device 2.

In a similar manner to the conference server 1, the relay server 6 may be constructed using, for example, a general-purpose work station or a personal computer having a known structure. The relay server 6 is configured to relay image data and audio data that are transmitted and received between the terminals 3.

Each of the terminals 3 is a terminal device that is configured to be connectable to a display 41, a microphone 43, a camera 44, a speaker 45 and the like. For example, a general-purpose personal computer may be used as each of the terminals 3. Each of the terminals 3 may be used by a user who participates in a remote conference. During the remote conference, each of the terminals 3 transmits image data captured by the camera 44 and sound data collected by the microphone 43 to the other terminal 3 that is participating in the remote conference, via the relay server 6. Note that, in a case where there are two or more of the other terminals 3, each of the terminals 3 transmits the sound data to all the other terminals 3. Further, each of the terminals 3 displays, on the display 41, images that are based on the image data received from the other terminal 3 via the relay server 6 and outputs, from the speaker 45, audio that is based on the sound data received from the other terminal 3. Note that, in a case where there are two or more of the other terminals 3, each of the terminals 3 performs processing based on the image data and the sound data received from each of the other terminals 3. Through the above processing, sharing of the image data and the sound data between the terminals 3 can be achieved in the conference system 100. The conference system 100 can provide a site of a conference that is smoothly conducted between the participants even when all the participants of the remote conference (the users of the terminals 3) are not located in the same place. Note that a known method can be used for control of the remote conference in the conference system 100, and a detailed explanation is therefore omitted. Further, in the present embodiment, of the image data and the sound data that are transmitted and received between the terminals 3, control in transmitting and receiving the sound data will be explained, and an explanation of control in transmitting and receiving the image data will be omitted.

An electrical configuration of the conference server 1 will be explained. The conference server 1 includes a CPU 11 that is configured to perform overall control of the conference server 1. The CPU 11 is electrically connected to a chip set 15, and is electrically connected to a ROM 12, a RAM 13 and a display control portion 14 via the chip set 15. The chip set 15 is connected to a chip set 16. The CPU 11 is electrically connected, via the chip sets 15 and 16, to an input portion 22, a hard disk drive (hereinafter simply referred to as an HDD) 17, an external connection interface (I/F) 19 and a communication I/F 18 that are each connected to the chip set 16.

The chip set 15 is a series of circuits that are configured to manage data transmission and reception between the CPU 11 and the ROM 12, the RAM 13 and the display control portion 14. The ROM 12 is configured to store a boot program, a basic input/output system (hereinafter simply referred to as a BIOS) and the like. The RAM 13 is configured to store various temporary data. The display control portion 14 is configured to control display of an image on the display 21. The chip set 16 is a series of circuits that are configured to manage data transmission and reception between the CPU 11 and the input portion 22, the HDD 17, the external connection I/F 19 and the communication I/F 18. The input portion 22 is a device that is configured to receive an operation input with respect to the conference server 1. The input portion 22 may be a keyboard, a mouse or the like. The HDD 17 is configured to store basic software (for example, an operating system (hereinafter simply referred to as an OS)), software (for example, a conference management program that will be described later) that is configured to cause the conference server 1 to function as a server, other various types of applications, data and the like. The external connection I/F 19 is an interface that is configured to connect to the above-described storage device 2. The communication I/F 18 is an interface that is configured to perform data communication, and is configured to connect in a wired or wireless manner to the network 8.

An electrical configuration of the terminal 3 will be explained. The terminal 3 includes a CPU 31 that is configured to perform overall control of the terminal 3. The CPU 31 is connected to a chip set 35, and is electrically connected to a ROM 32, a RAM 33 and a display control portion 34 via the chip set 35. The chip set 35 is connected to a chip set 36. The CPU 31 is electrically connected, via the chip sets 35 and 36, to an input portion 42, an HDD 37, a communication I/F 38 and a USB I/F 39 that are each connected to the chip set 36.

The chip set 35 is a series of circuits that are configured to manage data transmission and reception between the CPU 31 and the ROM 32, the RAM 33 and the display control portion 34. The ROM 32 is configured to store a boot program, a BIOS and the like. The RAM 33 is configured to store various temporary data. The RAM 33 may include a sound buffer, a reproduction buffer and a transmission buffer. The sound buffer is a storage area that is configured to temporarily store the sound data of the audio collected by the microphone 43 (which will be described later). The reproduction buffer is a storage area that is configured to temporarily store the sound data to output audio from the speaker 45 (which will be described later). The CPU 31 may secure the sound buffer and the reproduction buffer in the RAM 33 in accordance with an OS. The transmission buffer is a storage area that is configured to temporarily store compressed sound data, which will be described later. The CPU 31 may secure the transmission buffer in accordance with execution of a sound data communication program, which will be described later.

The display control portion 34 is configured to control display of an image on the display 41. The chip set 36 is a series of circuits that are configured to manage data transmission and reception between the CPU 31 and the input portion 42, the HDD 37 and the communication I/F 38. The input portion 42 is a device that is configured to receive an operation input with respect to the terminal 3. The input portion 42 may be a keyboard, a mouse or the like. The HDD 37 is configured to store the OS, software (for example, the sound data communication program that will be described later) that is configured to cause the terminal 3 to function as a client, other various types of applications, data and the like. The communication I/F 38 is an interface that is configured to perform data communication, and is configured to connect in a wired or wireless manner to the network 8.

The sound data communication program that will be described later may be compiled in a code that is appropriate to the terminal 3, and may be stored in a computer-readable storage device that is provided in a file server (not shown in the drawings), the conference server 1 or the like. In this case, the sound data communication program may be transmitted and provided as a transitory transmission signal from the file server, the conference server 1 or the like to each of the terminals 3 through an electric communication channel, such as the network 8. Alternatively, the sound data communication program may be stored in a recording medium (not shown in the drawings), such as a CD-ROM, a DVD-ROM, a flash ROM or the like. In this case, the sound data communication program may be provided to the terminal 3 by the CPU 31 of the terminal 3 reading the program from the recording medium using a reading device (not shown in the drawings) that is connectable to the terminal 3. The CPU 31 may save the provided sound data communication program in a computer-readable storage device that is provided in the terminal 3. Although, in the present embodiment, the HDD 37 is exemplified as the storage device, the storage device is not limited to the HDD 37. For example, it is preferable to employ a nonvolatile storage device, such as a solid state drive (not shown in the drawings), a flash ROM or the like, that is configured to hold data regardless of the length of time that the data is stored. This may also apply to the conference management program that is executed by the CPU 11 of the conference server 1 and a relay program that is executed by the CPU 61 of the relay server 6.

The USB I/F 39 is an interface to perform communication based on the universal serial bus standard. The CPU 31 is electrically connected to the microphone 43, the camera 44 and the speaker 45 via the USB I/F 39. The microphone 43 is configured to collect audio around the terminal 3, perform A/D conversion (sampling), and transmit sound data to the CPU 31 via the USB I/F 39. The CPU 31 may store the sampled sound data in the sound buffer provided in the RAM 33. The camera 44 is configured to capture an image of scenery around the terminal 3, perform A/D conversion, and transmit image data to the CPU 31 via the USB I/F 39. The speaker 45 is configured to output the audio obtained by D/A converting the sound data that is received from the CPU 31 via the USB I/F 39. The CPU 31 may store, in the reproduction buffer provided in the RAM 33, the sound data to output the audio from the speaker 45.

An electrical configuration of the relay server 6 will be explained. The relay server 6 includes the CPU 61 that is configured to perform overall control of the relay server 6. The CPU 61 is connected to a chip set 65, and is electrically connected to a ROM 62, a RAM 63 and a display control portion 64 via the chip set 65. The chip set 65 is connected to a chip set 66. The CPU 61 is electrically connected, via the chip sets 65 and 66, to an input portion 72, an HDD 67 and a communication I/F 68 that are connected to the chip set 66.

The chip set 65 is a series of circuits that are configured to manage data transmission and reception between the CPU 61 and the ROM 62, the RAM 63 and the display control portion 64. The ROM 62 is configured to store a boot program, a BIOS and the like. The RAM 63 is configured to store various temporary data. The display control portion 64 is configured to control display of an image on a display 71. The chip set 66 is a series of circuits that are configured to manage data transmission and reception between the CPU 61 and the input portion 72, the HDD 67 and the communication I/F 68. The input portion 72 is a device that is configured to receive an operation input with respect to the relay server 6. The input portion 72 may be a keyboard, a mouse or the like. The HDD 67 is configured to store an OS, software (for example, the relay program that will be described later) that is configured to cause the relay server 6 to function as a server that transfers received data, other various types of applications, data and the like. The communication I/F 68 is an interface that is configured to perform data communication, and is configured to connect in a wired or wireless manner to the network 8.

Figure 2:
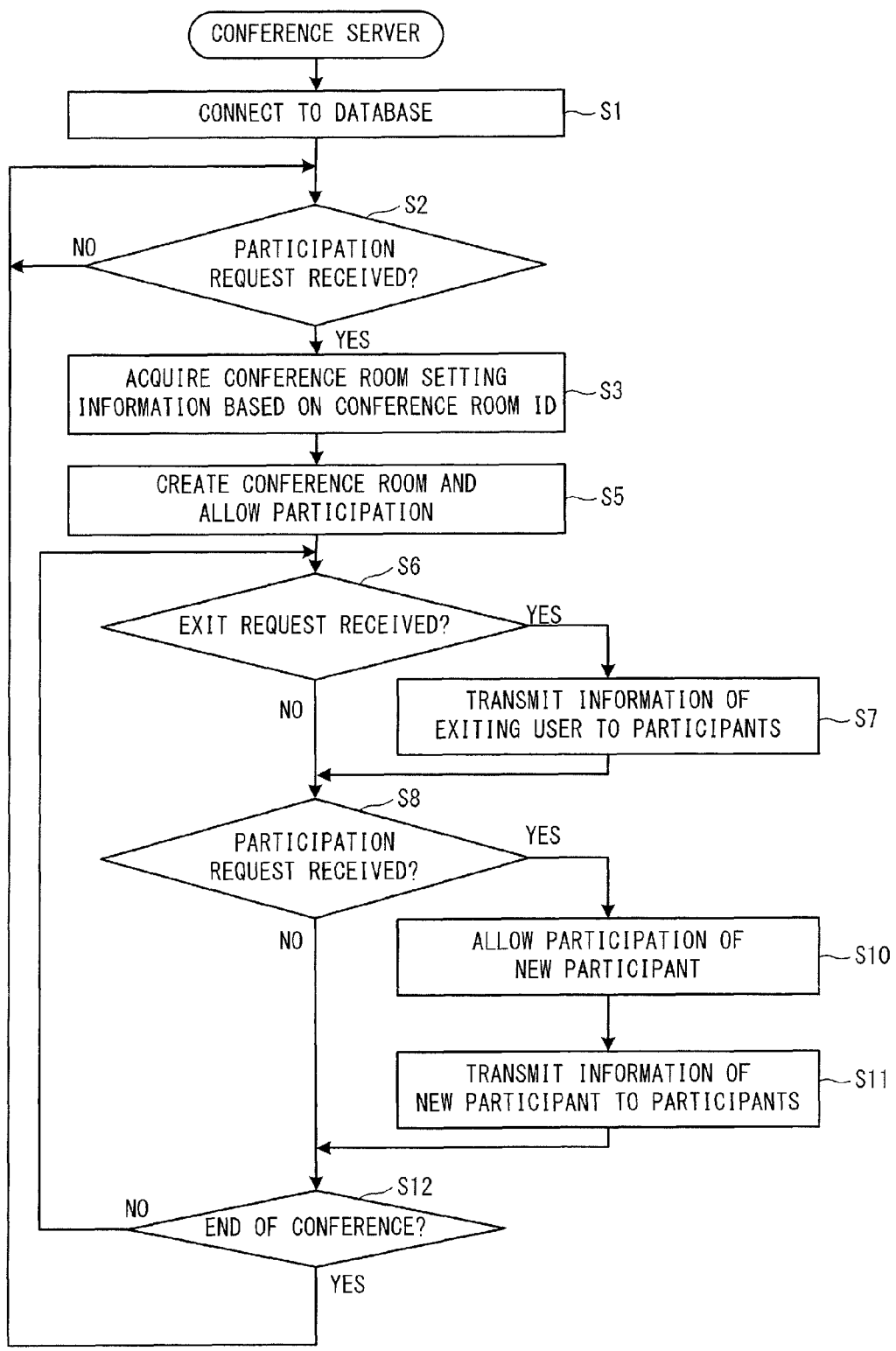
FIG. 2 is a flowchart of a conference management program that is executed by a conference server.

The flow of a remote conference that is conducted in the conference system 100 will be explained with reference to FIG. 2, along with operation of the conference management program that is executed by the CPU 11 of the conference server 1. In accordance with settings set by a server administrator, when the OS is started up, for example, the CPU 11 reads the conference management program from the HDD 17 and automatically executes the conference management program. The CPU 11 connects to the database constructed in the storage device 2, and registers the fact that the conference server 1 will function as the server of the remote conference (step S1). The CPU 11 shifts to a standby state in which the CPU 11 waits until a participation request to a conference room is received from any one of the terminals 3 (no at step S2). The participation request is transmitted to the conference server 1 by the CPU 31 of the terminal 3 based on an operation by the user of the terminal 3 who wants to participate in the remote conference.

The participation request includes a conference room ID of a virtual conference room in which the user wants to participate. In a case where the participation request is received from any one of the terminals 3 connected to the network 8 (yes at step S2), the CPU 11 acquires the conference room ID included in the participation request. In a case where the conference room that is identified by the acquired conference room ID has not yet been virtually created, the CPU 11 connects to the database and acquires conference room setting information based on the conference room ID (step S3). The conference room setting information is information relating to default settings of a virtual conference room that is created based on the conference room ID. The conference room setting information includes information relating to settings, such as "audio is set to a mute state when initially entering the conference room", "HE-ACC v2 is used as a codec for data compression of sound data, the bit rate is set to 48 kbps (CBR), and the sampling rate is set to 24 kHz" and the like.

The CPU 11 virtually creates the conference room on the RAM 13 and performs processing to allow the terminal 3 to participate in the conference (step S5). The conference room is a virtual space in which the remote conference is conducted. The CPU 11 sets, as the identification information of the created conference room, the conference room ID that is included in the participation request received at step S2, and sets the conference room based on the conference room setting information. The CPU 11 issues a unique ID to the terminal 3 that has transmitted the participation request. The CPU 11 resisters information of the terminal 3 (a network address, path information on the network 8 for the terminal 3 to be connected to the conference server 1, the unique ID and the like) in the database. The CPU 11 transmits, to the terminal 3, the conference room setting information, the unique ID, and information relating to the relay server 6 (a network address and information as to whether the relay server 6 has a transmission buffer). The CPU 11 allows the terminal 3 to participate in the remote conference in this manner and allows the user of the terminal 3 to virtually enter the conference room.

In a case where an exit request is not received from any one of the terminals 3 that is participating in the remote conference (no at step S6) and a participation request is not received from any one of the terminals 3 that is not participating in the remote conference (no at step S8), the CPU 11 determines whether or not to end the remote conference (step S12). In a case where there still remains any terminal 3 that is participating in the remote conference and an end request of the remote conference is not received, the CPU 11 determines that the remote conference is not to be ended (no at step S12). In this case, the CPU 11 returns the processing to step S6 and shifts to the standby state. In a case where a participation request is received from a terminal 3 that is not participating in the remote conference (yes at step S8), the CPU 61 performs processing to allow the terminal 3 to participate in the conference, in the same manner as the processing at step S5 (step S10). Specifically, the CPU 11 registers information of the terminal 3 in the database. Further, the CPU 11 transmits the conference room setting information, the unique ID and the information relating to the relay server 6 and allows the terminal 3 to participate in the remote conference. In this manner, the CPU 11 allows a user who newly participates in the remote conference (hereinafter referred to as a new participant) to virtually enter the conference room.

The CPU 11 transmits, to the terminal 3 that is already participating in the remote conference, the information of the terminal 3 that has newly joined the remote conference (step S11). In other words, the CPU 11 transmits a notification relating to the entering of the new participant into the conference room, to the other user who is already in the conference room. This notification includes the unique ID issued to the terminal 3 that has newly joined the remote conference. Further, the CPU 11 determines an optimal path based on the path information of the terminals 3 and the relay serer 6 stored in the database. The optimal path is a path on the network 8 that is optimal when the sound data is transmitted and received between the terminal 3 that is already participating in the remote conference and the terminal 3 that has newly joined the remote conference. The CPU 11 registers, in the database, the path information relating to the determined optimal path, and transmits the path information to each of the terminals 3. The CPU 11 advances the processing to step S12.

In a case where the exit request is received from any one of the terminals 3 that is participating in the remote conference (yes at step S6), the CPU 11 deletes the information of the terminal 3 from the database. The exit request is transmitted to the conference server 1 by the CPU 31 of the terminal 3 based on an operation of the user of the terminal 3 who wants to exit from the remote conference. The CPU 11 allows the user who wants to exit from the remote conference (hereinafter referred to as an exiting user) to virtually exit from the conference room. The CPU 11 transmits the information of the terminal 3 that has exited from the remote conference, to the terminal 3 that remains in the remote conference (step S7). In other words, the CPU 11 transmits a notification relating to the exiting of the exiting user from the conference room, to the other user who remains in the conference room. The CPU 11 advances the processing to step S8. Until the CPU 11 determines that the remote conference is to be ended, the CPU 11 repeats the above-described processing from step S6 to step S12.

In a case where all the terminals 3 have exited from the remote conference or in a case where the CPU 11 receives the end request for the remote conference (yes at step S12), the CPU 11 ends the remote conference. The end request is transmitted to the conference server 1 by the CPU 31 of the terminal 3 that hosts the remote conference (for example, the terminal 3 that is involved in creating the conference room), based on an operation of the user of the terminal 3. The CPU 11 removes the virtual conference room from the RAM 13, and deletes from the database the information of the terminals 3 that are participating in the conference to be ended. The CPU 11 returns the processing to step S2, shifts to the standby state in which the CPU 11 waits until a participation request is newly received from any one of the terminals 3. With the above-described processing, the conference server 1 virtually creates the conference room of the remote conference and performs control of the plurality of terminals 3 that participate in and exit from the remote conference.

Operations will be explained that are performed when the CPU 31 of the terminal 3 executes the sound data communication program and transmits and receives sound data to and from the other terminal 3 that is participating in the remote conference. First, an outline of the transmission and reception of the sound data will be explained. In the present embodiment, in accordance with the sound data communication program, the CPU 31 transmits the sound data to the other terminal 3 that is participating in the remote conference, via the network 8. The CPU 31 of each of the terminals 3 performs sampling of the audio collected by the microphone 43, converts the collected audio into sound data, and compresses the sound data using a codec. Hereinafter, the sound data that has been compressed using the codec is referred to as compressed sound data. The CPU 31 transmits the compressed sound data to the other terminal 3 via the network 8. The CPU 31 of each of the terminals 3 expands the compressed sound data received from the other terminal 3 using the codec. The CPU 31 performs D/A conversion on the expanded sound data, and outputs the converted sound data from the speaker 45. The smaller the data amount of the compressed sound data that is transmitted at a time, the shorter the time that is required for the transmission side terminal 3 to combine the compressed sound data, the shorter the time that is required to transmit and receive the combined compressed sound data, and the shorter the time that is required for the receiving side terminal 3 to decode and output the combined compressed sound data. Therefore, a discrepancy (a delay) between a time at which the transmission side terminal 3 collects sound and a time at which the receiving side terminal 3 outputs audio decreases. Thus, the CPU 31 of the receiving side terminal 3 can reproduce smooth audio with reduced distortion and higher linearity. In the present embodiment, the CPU 31 divides the sound data into one or more data pieces each corresponding to a unit time period and transmits the divided data. The unit time period that is used to divide the sound data may be, for example, 5 milliseconds (ms).

A specific example will be explained in which a fixed bit rate is set in parameter settings of the codec and the compressed sound data for which the bandwidth is compressed to 20 kilobits per second (kbps) is generated. In this case, the data amount of the compressed sound data for 1 ms is 20 bits. Therefore, the data amount for one unit time period, namely, for 5 ms, is 100 bits (12.5 bytes). In data transmission and reception via the network 8, the data is transmitted in a state in which various headers and the like are added thereto, namely, in a packetized form. For example, when the compressed sound data is transmitted, the CPU 31 adds a total of 120 bytes of various headers and additional information (hereinafter referred to as the headers and the like) to the compressed sound data. The various headers may include, for example, an IP header of 20 bytes, a TCP header of 20 bytes, a protocol header of 32 bytes and an encryption header of 32 bytes. The additional information may be, for example, 16 bytes of information that is added in order to inhibit cross talk or the like (details will be described later). Therefore, when the compressed sound data corresponding to one unit time period is transmitted, the data amount is 132.5 bytes. In order to inhibit a delay in reproducing the audio, the CPU 31 needs to complete the transmission of the compressed sound data corresponding to one unit time period within 5 ms. The bandwidth that is necessary to transmit the compressed sound data of 132.5 bytes within 5 ms is 212 kbps (132.5 bytes/5 ms=212,000 bits/sec=212 kbps).

If jitter occurs in the network 8 or the bandwidth varies, there is a possibility that the CPU 31 cannot secure the bandwidth that is necessary to transmit the compressed sound data corresponding to one unit time period. If the sound data cannot be transmitted within one unit time period, the CPU 31 may discard the packet of the sound data. Therefore, in this type of case, in the present embodiment, the CPU 31 combines pieces of the compressed sound data corresponding to a plurality of unit time periods, and performs a single transmission of the compressed sound data that would otherwise be transmitted in a plurality of transmissions. Thus, the CPU 31 can reduce the data amount of the headers and the like, which are necessary for data transmission via the network 8 and which would otherwise be transmitted in the plurality of transmissions, to the data amount of the headers and the like in the single transmission. In the above-described example, for example, in a case where the CPU 31 combines four pieces of the compressed sound data corresponding to four unit time periods (corresponding to 20 ms) and performs a single data transmission, the data amount of the headers and the like is 120 bytes, which is the same as the amount of the headers and the like when a piece of the compressed sound data corresponding to one unit time period is transmitted. Meanwhile, the data amount of the compressed sound data for 20 ms is 50 bytes. It is thus sufficient for the CPU 31 to complete the transmission of a total of 170 bytes within 20 ms. In this case, a necessary bandwidth is 68 kbps (170 bytes/20 ms=68000 bits/sec=68 kbps).

Figure 3:
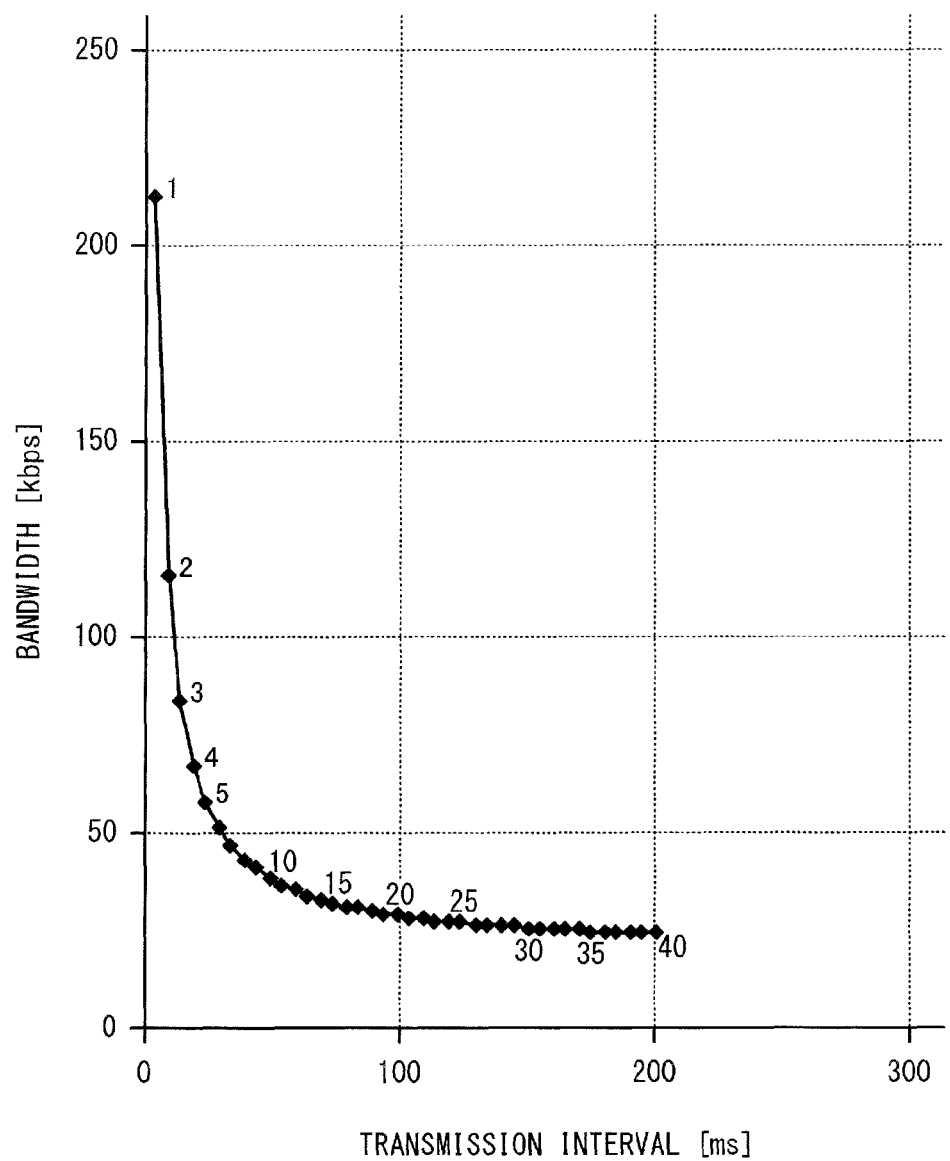
FIG. 3 is a graph illustrating a relationship between a bandwidth and a transmission interval.

FIG. 3 shows a relationship between a bandwidth and a transmission interval when the unit time period is 5 ms. Note that numbers that are respectively assigned to dots that are plotted on a graph shown in FIG. 3 each represent a combined number of the compressed sound data per unit time period. The lower limit and the upper limit of the combined number in the present embodiment are 1 and 40, respectively. The transmission interval is a time period that is permissible as a time period in which the transmission of the compressed sound data is completed. Namely, the transmission interval corresponds to a total time of the combined number of unit time periods. According to FIG. 3, it can be seen that the bandwidth decreases as the transmission interval becomes longer. However, as described above, in order to inhibit the delay in reproducing the audio, it is more preferable if the transmission interval is shorter. For this reason, in the execution of the sound data communication program that will be described later, in a case where a wide bandwidth can be secured, the CPU 31 performs processing that reduces the combined number of the pieces of compressed sound data, in order to inhibit the delay. In a case where the bandwidth becomes narrow, the CPU 31 performs processing that increases the combined number of the pieces of compressed sound data, and narrows the bandwidth that is necessary for transmission, thus inhibiting packet loss.

Hereinafter, processing that is performed by the CPU 31 of each of the terminals 3 executing the sound data communication program will be explained with reference to FIG. 4 to FIG. 8. Based on an operation input entered through the input portion 42, the CPU 31 reads the sound data communication program from the HDD 37 and executes the program. In initial settings when executing the sound data communication program, the CPU 31 secures, in the RAM 3, a storage area for a transmission buffer that corresponds to the other terminal 3 that participates in the remote conference. In a case where there are two or more of the other terminals 3, the CPU 31 secures storage areas for a plurality of transmission buffers that respectively correspond to the other terminals 3. The transmission buffer is a storage area to temporarily store the compressed sound data that is generated by the CPU 31 to be transmitted to the other terminal 3. Note that, in a case where another terminal 3 has newly joined the remote conference, the CPU 31 each time secures, in the RAM 33, a storage area for a transmission buffer that corresponds to the terminal 3 that has newly joined the remote conference. Further, the CPU 31 stores data indicating a combined time in the RAM 33. The combined time corresponds to (e.g., is equal to) a time period indicating a total reproduction time of combined sound data. The combined sound data is sound data that is generated from the compressed sound data corresponding to the same number of unit time periods as the combined number, and that is to be transmitted to the other terminal 3. Note that, as described above, the lower limit of the combined number is 1. Therefore, the combined sound data in this case is the compressed sound data corresponding to one unit time period. On the other hand, in a case where the combined number is two or more, the combined sound data is generated by combining pieces of the compressed sound data, each piece corresponding to one unit time period and the number of the combined pieces being the same as the combined number. Therefore, strictly speaking, the combined sound data is not necessarily generated by combining pieces of the compressed sound data. However, for explanatory convenience, the expression "combining pieces of the compressed sound data" is used, including a case in which the compressed sound data for one unit time period is taken directly as the combined sound data. Since the reproduction time of a piece of the compressed sound data corresponds to one unit time period, the combined time is proportional to the combined number. In the present embodiment, the lower limit and the upper limit of the combined number are 1 and 40, respectively. Therefore, the lower limit and the upper limit of the combined time are 5 ms and 200 ms, respectively.

Figure 4:
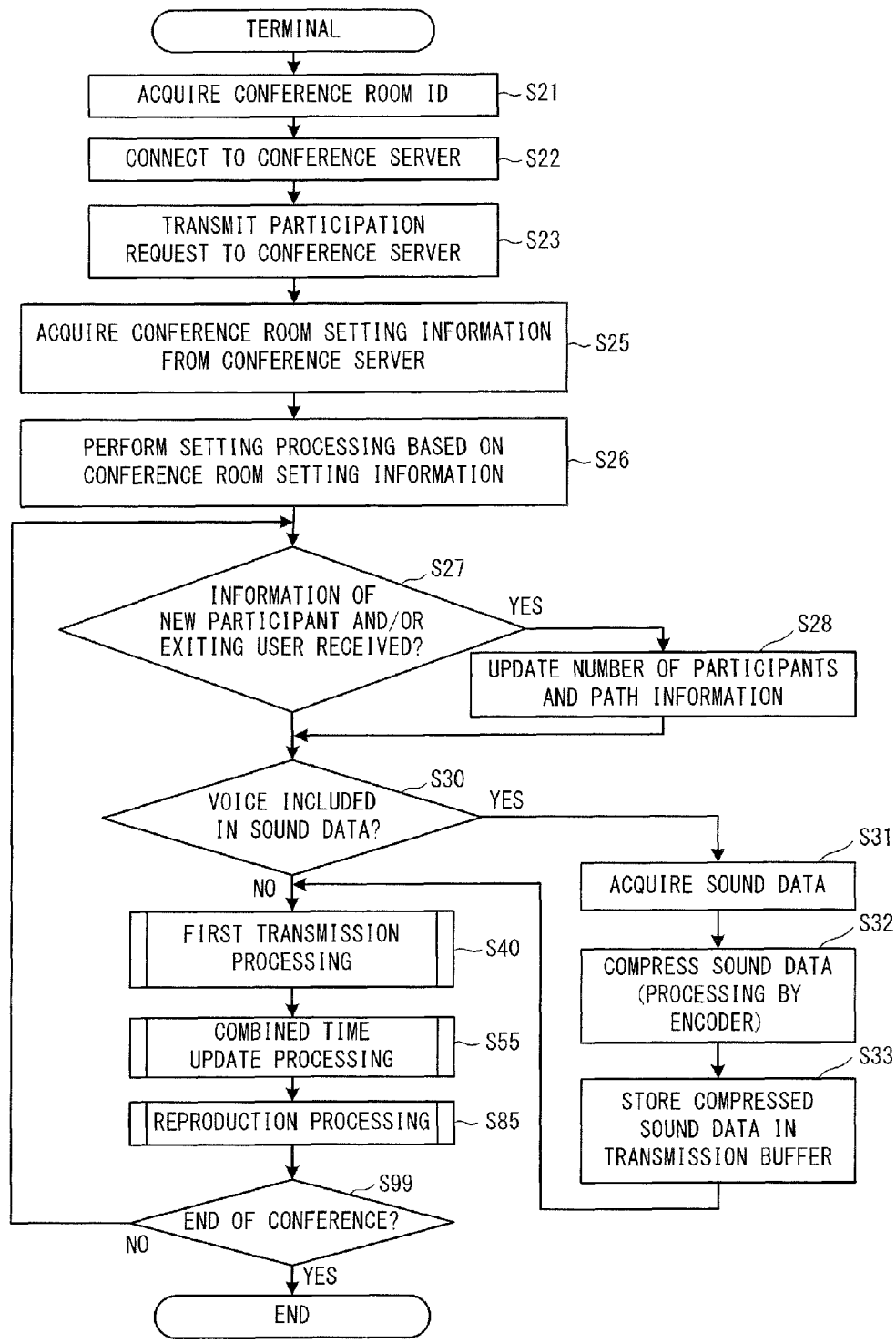
FIG. 4 is a flowchart of a sound data communication program that is executed by a terminal.

As shown in FIG. 4, the CPU 31 receives, via the input portion 42, an input of the conference room ID of the virtual conference room that the user wants to enter. For example, before the time at which the remote conference is to be held, an email is transmitted from the conference server 1 to email addresses of the respective terminals 3 that are scheduled to participate in the remote conference. This email includes a uniform resource locator (URL) for the remote conference by the terminals 3. This URL includes, for example, the conference room ID of the virtual conference room, as a query parameter. In a case where an operation to select this URL is received via the input portion 42, the CPU 31 acquires the conference room ID input by the user (step S21). The CPU 31 attempts to connect with the conference server 1 via the network 8 (step S22). When the connection with the conference server 1 is established, the CPU 31 transmits a participation request that includes the conference room ID to the conference server 1 (step S23). In response to the participation request, the CPU 31 receives, from the conference server 1, a notification that permits entry into a conference room that is created by the CPU 11 of the conference server 1 based on the conference room ID, or into an existing conference room having the same conference room ID. Further, the CPU 31 acquires, from the conference server 1, the conference room setting information, the unique ID and the information relating to the relay server 6 (the network address, the information as to whether or not there is a transmission buffer) (step S25). Based on the acquired conference room setting information and the like, the CPU 31 performs various types of setting processing in order to participate in the remote conference (step S26). Thus, the CPU 31 allows the user to enter the conference room that has been virtually created by the conference server 1.

The CPU 31 repeatedly performs processing from step S27 to step S99 that will be explained below, until the remote conference ends. By repeating the processing from step S27 to step S99, the CPU 31 transmits the sound data to the other terminal 3 that is participating in the remote conference and reproduces the sound data received from the other terminal 3, until the remote conference ends. The CPU 31 determines whether or not the information relating to the other terminal 3 has been received from the conference server 1 (step S27). As described above, the information relating to the other terminal 3 that is received by the terminal 3 from the conference server 1 may include information of a new participant, information of an exiting user or the like. In a case where the information of the other terminal 3 has not been received (no at step S27), the CPU 31 advances the processing to step S30. In a case where the information of the other terminal 3 has been received (yes at step S27), the CPU 31 updates the number of the participants (the users of the respective terminals 3) in accordance with the entering or exiting from the conference room, and stores the updated number in the RAM 33. Further, in a case where the other terminal 3 newly joins the remote conference, the CPU 31 stores the path information with the new terminal 3 received from the conference server 1 in the RAM 33 (step S28). The CPU 31 advances the processing to step S30.

The CPU 31 performs, for example, known frequency filtering processing on the sound data that is output from the microphone 43, and determines whether or not audio (voice) uttered by the user is included in the sound data (step S30). In addition to or instead of the aforementioned frequency filtering processing, the CPU 31 may determine whether or not voice is included in the sound data based on a result of comparing a sound volume of the sound data with a predetermined threshold value. In a case where voice is not included in the sound data (no at step S30), the CPU 31 advances the processing to step S40. In a case where voice is included in the sound data (yes at step S30), the CPU 31 acquires a piece of the sound data corresponding to one unit time period (5 ms) from the sound buffer of the RAM 33 (step S31). The CPU 31 processes and compresses the piece of the sound data corresponding to one unit time period using a known encoder (for example, HE-AAC v2, G. 711, G. 729, Speex or Opus) for which encoding conditions based on default settings are set, and thus generates the compressed sound data corresponding to one unit time period (step S32). The CPU 31 stores the generated compressed sound data in the transmission buffer of the RAM 33 (step S33) and advances the processing to step S40.

Figure 5:
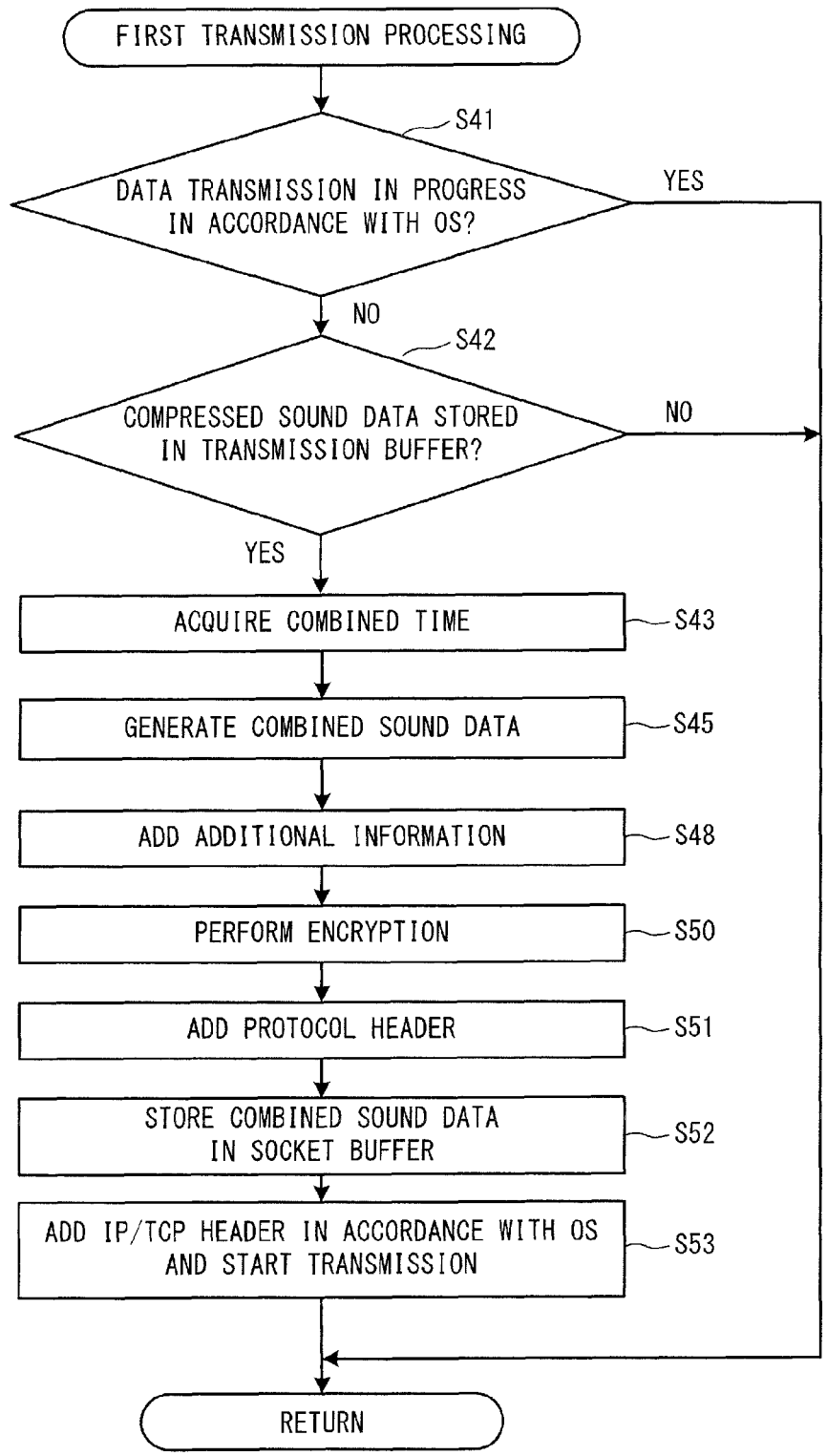
FIG. 5 is a flowchart of first transmission processing in the sound data communication program.

The CPU 31 performs a subroutine of first transmission processing (step S40). In a case where there are two or more of the other terminals 3 that are participating in the remote conference, in the sound data transmission, the CPU 31 performs the first transmission processing by sequentially setting the other terminals 3 as transmission targets. As shown in FIG. 5, the CPU 31 transmits a query to the OS and determines whether or not processing for transmitting data in accordance with the OS is being performed (step S41). In a case where the data is being transmitted in accordance with the OS (yes at step S41), the CPU 31 ends the transmission processing in order to continue the ongoing transmission of the data in accordance with the OS. The CPU 31 returns the processing to the main routine (refer to FIG. 4) of the sound data communication program, and advances the processing to step S55. In a case where the data is not being transmitted in accordance with the OS (no at step S41), the CPU 31 determines whether or not the compressed sound data is stored in the transmission buffer that corresponds to the transmission target terminal 3 (step S42). In a case where there is no compressed sound data in the transmission buffer (no at step S42), there is no sound data to be transmitted to the other terminal 3. Therefore, the CPU 31 ends the first transmission processing. The CPU 31 returns the processing to the main routine (refer to FIG. 4) of the sound data communication program, and advances the processing to step S55.

In a case where there is the compressed sound data in the transmission buffer that corresponds to the transmission target terminal 3 (yes at step S42), the CPU 31 acquires the combined time that is updated by combined time update processing, which will be described later, and that is stored in the RAM 33 (step S43). The CPU 31 retrieves, from the transmission buffer, one or more pieces of the compressed sound data for the combined number that corresponds to the combined time, in order from the earliest generation time, and combines the retrieved compressed sound data, thus generating the combined sound data (step S45). Note that, as described above, in a case where the combined time is the same as the unit time period (in a case where the combined number is 1), the CPU 31 directly takes, as the combined sound data, a piece of the compressed sound data that has the earliest generation time. The CPU 31 adds additional information to the combined sound data (step S48). The additional information may include information indicating the combined time, the unique ID of the terminal 3 and the like. The unique ID of the terminal 3 is included in the additional information in order to avoid cross talk when the receiving side terminal 3 receives a plurality pieces of the combined sound data that are respectively transmitted from a plurality of the other terminals 3.

The CPU 31 encrypts the combined sound data to which the additional information has been added, in accordance with a predetermined algorithm, and adds an encryption header (step S50). For example, a secure sockets layer (SSL), transport layer security (TLS), a secure real-time transport protocol (SRTP) or the like may be used as an encryption protocol. The CPU 31 adds a header of a predetermined communication protocol to the encrypted combined sound data (step S51). For example, a real-time transport protocol (RTP), a hypertext transfer protocol (HTTP), HTTP over SSL/TLS (HTTPS) or the like may be used as the communication protocol.

The CPU 31 performs processing for storing the combined sound data to which the header of the communication protocol has been added in a transmission socket buffer that is secured in the RAM 33 in accordance with the OS (step S52). The CPU 31 outputs a transmission request that instructs the OS to transmit the combined sound data. In accordance with the OS, the CPU 31 adds an IP/TCP header to the combined sound data stored in the transmission socket buffer, and performs processing for transmitting the combined sound data to the other terminal 3 via the network 8 (step S53). Based on the path information, the CPU 31 determines whether or not the relay server 6 is included in the path through which the combined sound data is transmitted from the terminal 3 to the transmission target terminal 3. In a case where the CPU 31 determines that the relay server 6 is included, the CPU 31 sets the relay server 6 that is located next to the terminal 3 on the path, as a transmission destination that is specified by the IP/TCP header. After the CPU 31 starts the transmission of the combined sound data, the CPU 31 ends the first transmission processing. The CPU 31 returns the processing to the main routine of the sound data communication program, and advances the processing to step S55. Note that various header information, such as encryption header, header of the predetermined communication protocol, and the IP/TCP header, may be other examples of the additional information.

Figure 6:
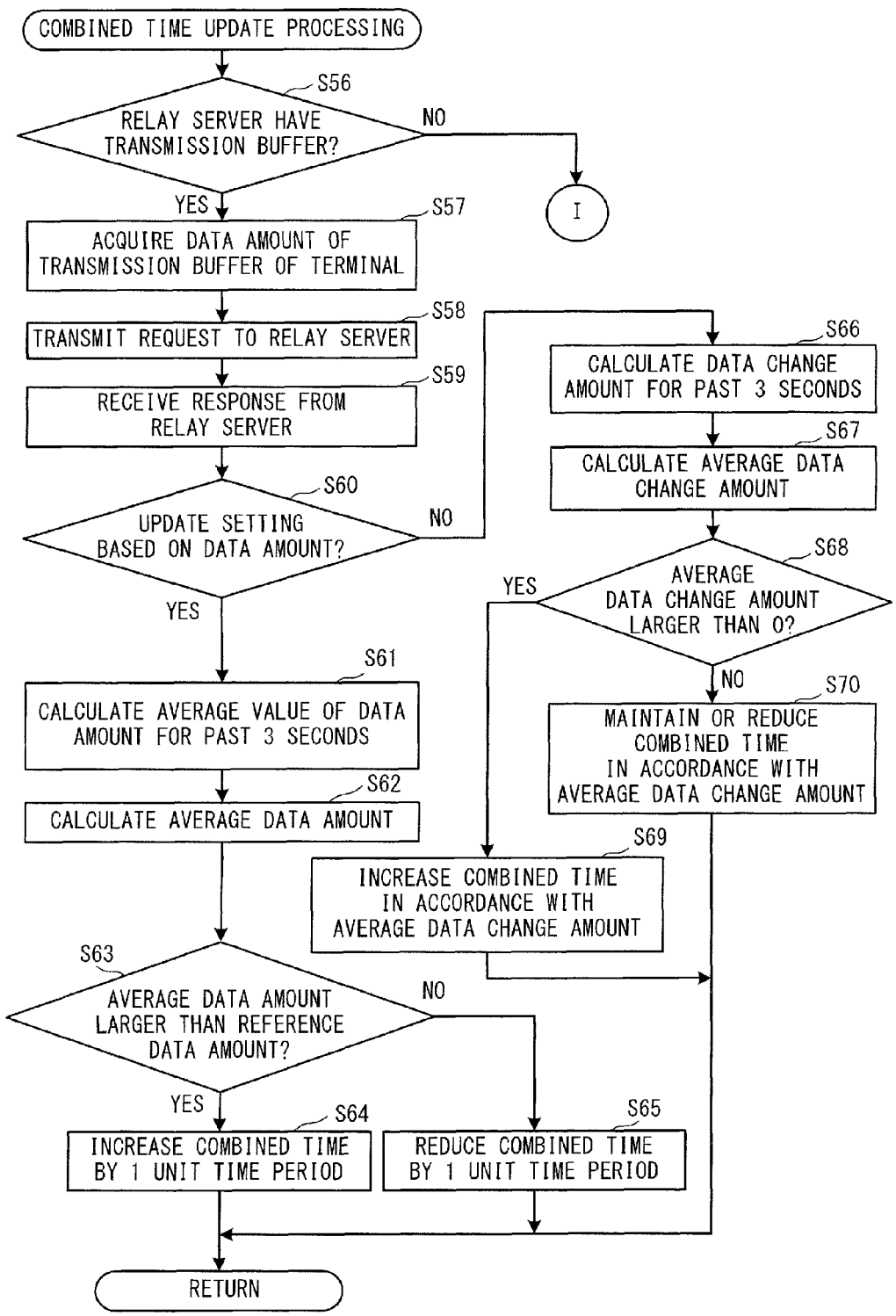
FIG. 6 is a flowchart of combined time update processing in the sound data communication program.

As shown in FIG. 4, the CPU 31 performs a subroutine of the combined time update processing (step S55). As shown in FIG. 6, the CPU 31 determines, based on the information acquired from the conference server 1, whether or not the relay server 6 that is identified by the path information between the terminal 3 and the transmission target terminal 3 has a transmission buffer (step S56). In a case where the relay server 6 has the transmission buffer (yes at step S56), the CPU 31 acquires the data amount of the compressed sound data stored in the transmission buffer of the RAM 33 that corresponds to the transmission target terminal 3 (step S57). The CPU 31 adds an acquisition time to the acquired data amount of the transmission buffer of the RAM 33, and stores the updated data in the RAM 33. Further, the CPU 31 transmits an acquisition request that queries the data amount of the transmission buffer, to all of the one or more relay servers 6 that are included in the path (step S58). Although details will be described later, in a case where the acquisition request of the data amount of the transmission buffer is received from the terminal 3, the CPU 61 of the relay server 6 acquires the data amount of the compressed sound data stored in a transmission buffer of the RAM 63. The CPU 61 transmits, to the terminal 3 that has transmitted the request, a response that notifies the terminal 3 of the acquired data amount. In a case where there are a plurality of the relay servers 6 that are included in the path, the CPU 31 of the terminal 3 receives a response from each of all the relay servers 6 (step S59). In this manner, the CPU 31 acquires the data amounts of all the compressed sound data temporarily stored in the one or more transmission buffers of the one or more relay servers 6 during transfer. In the same manner as described above, the CPU 31 adds an acquisition time to the acquired data amount of the relay server 6, and stores the updated data in the RAM 33.

The CPU 31 determines, in the settings performed in advance in relation to the operations of the sound data communication program, whether the setting to update the combined time based on a data amount of the transmission buffer has been set, or the setting to update the combined time based on a data change amount of the transmission buffer has been set (step S60). In a case where the setting to update the combined time based on the data amount has been set (yes at step S60), the CPU 31 calculates an average value of the data amount of the transmission buffer of the terminal 3 stored in the RAM 33 at step S57, based on the data amounts for the past three seconds. Similarly, the CPU 31 calculates an average value of the data amount of the transmission buffer of the relay server 6 stored in the RAM 33 at step S59, based on the data amounts for the past three seconds (step S61). The CPU 31 adds the two average values obtained at step S61, and further calculates an average value (hereinafter referred to as an average data amount) of the added value (step S62). More specifically, the average data amount is an average value, for the past three seconds, of the data amounts of the compressed sound data stored in all the transmission buffers that are included in the path.

The CPU 31 determines whether or not the average data amount is larger than the data amount of the compressed sound data corresponding to one unit time period (corresponding to 5 ms) (step S63). Hereinafter, the data amount of the compressed sound data corresponding to one unit time period is referred to as a reference data amount. Alternatively, the data amount, acquired in step S57, may be compared with the reference data amount. In other word, the CPU 31 may determine whether or not the data amount, acquired in step S57, is larger than the reference data amount. In a case where the average data amount is larger than the reference data amount (yes at step S63), the CPU 31 determines that the compressed sound data that is stored in the transmission buffer is increasing and that the bandwidth of the network 8 is narrower than the bandwidth that is necessary for data transmission. Therefore, the CPU 31 increases the combined time of the compressed sound data by one unit time period (step S64), and ends the combined time update processing. In a case where the combined time has already reached the upper limit of 200 ms, the CPU 31 maintains the combined time of the upper limit. The CPU 31 returns the processing to the main routine of the sound data communication program, and advances the processing to step S85 (refer to FIG. 4). In a case where the average data amount is not larger than the reference data amount (no at step S63), the CPU 31 determines that the compressed sound data stored in the transmission buffer is decreasing or is not being accumulated and that the bandwidth that is necessary for data transmission is secured in the network 8. Therefore, the CPU 31 reduces the combined time of the compressed sound data by one unit time period (step S65), and ends the combined time update processing. In a case where the combined time has already reached the lower limit of 5 ms, the CPU 31 maintains the combined time of the lower limit. The CPU 31 returns the processing to the main routine of the sound data communication program.

Regarding the operations of the sound data communication program, in a case where the setting to update the combined time based on the data change amount of the transmission buffer has been set (no at step S60), the CPU 31 advances the processing to step S66. The CPU 31 calculates an amount of change in the data amount (hereinafter referred to as a data change amount) in the past three seconds, based on the data amounts of the transmission buffer of the terminal 3 stored in the RAM 33 at step S57. Similarly, the CPU 31 calculates a data change amount in the past three seconds, based on the data amounts of the transmission buffer of the relay server 6 stored in the RAM 33 at step S59 (step S66). The CPU 31 calculates an average value (an average data change amount) of the two data change amounts obtained by the processing at step S66 (step S67). More specifically, the average data change amount is an average value of the change amounts, for the past three seconds, of the data amounts of the compressed sound data stored in all the transmission buffers that are included in the path.

In a case where the average data change amount is larger than zero (namely, in a case where the average data change amount has a positive value) (yes at step S68), the CPU 31 determines that the bandwidth of the network 8 is narrower than the bandwidth that is necessary for data transmission, and that the data amount of the compressed sound data that is stored in the transmission buffer is increasing. In order to reduce the data amount of the transmission buffer, the CPU 31 performs processing for making the bandwidth necessary for data transmission narrower than the bandwidth of the network 8. Specifically, the CPU 31 performs processing for increasing the combined time corresponding to the average data change amount (an increased amount) (step S69).

The processing at step S69 will be explained using a specific example in which the reference data amount is 12.5 bytes, the data amount of the headers and the like to be added in a single data transmission is 120 bytes, and the average data change amount for the past three seconds is 250 bytes. In this case, the CPU 31 increases the combined time and combines more pieces of the compressed sound data, thus reducing the number of times of data transmission. Thus, the CPU 31 performs processing for making an amount of reduction in the data amount due to the removal of the headers and the like to be larger than the average data change amount. For example, in a case where the current combined time is 30 ms, namely, in a case where the combined number is 6, the CPU 31 transmits 195 bytes (120+12.5×6=195 bytes) of data within 30 ms in a single data transmission. When such data transmission is performed four times, the CPU 31 transmits 780 bytes (195× 4=780 bytes) of data within 120 ms. In contrast to this, the CPU 31 increases the combined time to 120 ms, which is four times the current combined time of 30 ms, and combines the compressed sound data for four transmissions and transmits the combined sound data in a single transmission.

Thus, the CPU 31 can reduce the data amount of the headers and the like corresponding to three transmissions. In this case, the reduced data amount of the headers and the like is 360 bytes (120×3=360 bytes). It is thus sufficient for the CPU 31 to transmit 420 bytes (120+(12.5×6)×4=420 bytes) of data within 120 ms. By thus combining the compressed sound data for four transmissions and transmitting the data in a single transmission, the data amount of the headers and the like decreases, although the data amount of the compressed sound data itself does not change. In other word, the change in the data amount is generated by the change of a number of times of transmission of the compressed sound data in a predetermined interval (e.g., from four times to once in 120 ms). In this manner, the CPU 31 can reduce the data amount by 360 bytes, which is larger than the average data change amount of 250 bytes (the increased amount of 250 bytes), and it is thus possible to reduce the data amount of the transmission buffer.

In the above-described example, by quadrupling the combined time (the combined number), the compressed sound data for four transmissions are combined and transmitted in a single transmission. Other than that, even in a case where the combined time (the combined number) of the compressed sound data to be transmitted in a single transmission is further increased and the compressed sound data for five or more transmissions are combined, it is also possible to cause the data amount to be reduced to be larger than the average data change amount. For example, in a case where the combined time 30 ms is increased to 150 ms, the compressed sound data for five transmissions are combined and transmitted in a single transmission. In this case, it is possible to reduce the data amount of the headers and the like corresponding to four transmissions, namely, by 480 bytes (120×4=480 bytes). However, as described above, as the combined time becomes longer, the delay in reproducing audio becomes larger. Therefore, it is preferable that, in setting the combined time to be increased, the CPU 31 sets a minimum combined time, of any combined times that each make an absolute value of the data amount to be reduced to exceed an absolute value of the average data change amount. In the above-described example, the CPU 31 sets, as the combined time, 120 ms (the combined number 24) that is the minimum combined time of the combined times each of which makes the absolute value of the data amount to be reduced to exceed the absolute value of the average data change amount.

Processing will be explained that is performed in a case where the average data change amount for the past three seconds is zero or in a case where the average data change amount has a negative value (for example, −250 bytes) (no at step S68), namely, in a case where the data amount of the transmission buffer has decreased. In a case where the average data change amount is zero, the CPU 31 determines that the data amount of the compressed sound data that is accumulated in the transmission buffer is balanced with the data amount of the compressed sound data that is retrieved from the transmission buffer and transmitted to the transmission target terminal 3. The CPU 31 thus maintains the combined time (step S70). In a case where the average data change amount is a negative value, the CPU 31 performs processing for reducing the combined time in accordance with the average data change amount (a decreased amount). In this manner, the CPU 31 reduces the compressed sound data to be transmitted in a single transmission, and increases the number of times of data transmission (step S70). Thus, the CPU 31 performs processing for making an amount of increase in the data amount due to the addition of the headers and the like to be larger than the average data change amount for the past three seconds. For example, in a case where the current combined time is 120 ms, namely, in a case where the combined number is 24, the CPU 31 transmits 420 bytes of data within 120 ms in a single data transmission. In contrast to this, in a case where the combined time is reduced to 30 ms (the combined number 6), which is one fourth of the current combined time of 120 ms and the compressed sound data for a single transmission is divided and transmitted in four transmissions, the CPU 31 transmits 195 byes of the compressed sound data within 30 ms in each transmission. In the four transmissions that are performed within 120 ms, the CPU 31 transmits 780 bytes of the compressed sound data. In this manner, the CPU 31 reduces the combined time to one fourth, namely, 30 ms, and performs processing that divides the compressed sound data for a single transmission and transmits the divided compressed sound data in four transmissions, thus increasing the data amount of the headers and the like. In this case, the increased data amount of the headers and the like is 360 bytes. By thus dividing the compressed sound data for a single transmission into the compressed sound data for four transmissions, the data amount of the headers and the like increases, although the data amount of the compressed sound data itself does not change. In this manner, the CPU 31 can increase the data amount by 360 bytes that is larger than the average data change amount of −250 bytes (the decreased amount of 250 bytes), and it is therefore possible to increase the data amount of the transmission buffer.

In the above-described example, by quartering the combined time (the combined number), the compressed sound data for a single transmission is divided and transmitted in four transmissions. Other than that, in a case where the combined time (the combined number) of the compressed sound data to be transmitted at a time is further reduced and the compressed sound data is divided and transmitted in five or more transmissions, it is also possible to cause the data amount to be increased to be larger than the average data change amount (the decreased amount). For example, in a case where the combined time of 120 ms is reduced to 15 ms, the compressed sound data for a single transmission is divided and transmitted in eight transmissions. In this case, it is possible to increase the data amount of the headers and the like corresponding to seven transmissions, namely, by 840 bytes. However, as described above, as the combined time becomes shorter, the bandwidth that is necessary for transmission becomes wider. As a result, the possibility of the occurrence of packet loss becomes larger. Therefore, it is preferable that, in setting the combined time to be reduced, the CPU 31 sets a maximum combined time, of any combined times that each make an absolute value of the data amount to be increased to exceed an absolute value of the average data change amount. In the above-described example, the CPU 31 sets, as the combined time, 30 ms (the combined number 6) that is the maximum combined time of the combined times each of which makes the absolute value of the data amount to be increased to exceed the absolute value of the average data change amount.

In this manner, the CPU 31 sets the combined time that corresponds to the data change amount of the transmission buffer at step S69 or step S70, and thus controls the data amount of the compressed sound data that is accumulated in the transmission buffer to be maintained constant. After step S69 or step S70, the CPU 31 ends the combined time update processing and returns the processing to the main routine of the sound data communication program.

As described above, the terminal 3 determines the path through which the combined sound data is transmitted to the other terminal 3, based on the path information received from the conference server 1. However, there may be a case in which the relay server 6 is not included in the path. Further, in settings of the relay program (which will be described later) that is executed by the CPU 61 of the relay server 6, there may be a case in which the CPU 61 of the relay server 6 does not secure a storage area for the transmission buffer in the RAM 63. In this case, in the combined time update processing shown in FIG. 6, the CPU 31 of the terminal 3 determines that there is no transmission buffer of the relay server 6 (no at step S56) and advances the processing to step S71 shown in FIG. 7.

Figure 7:
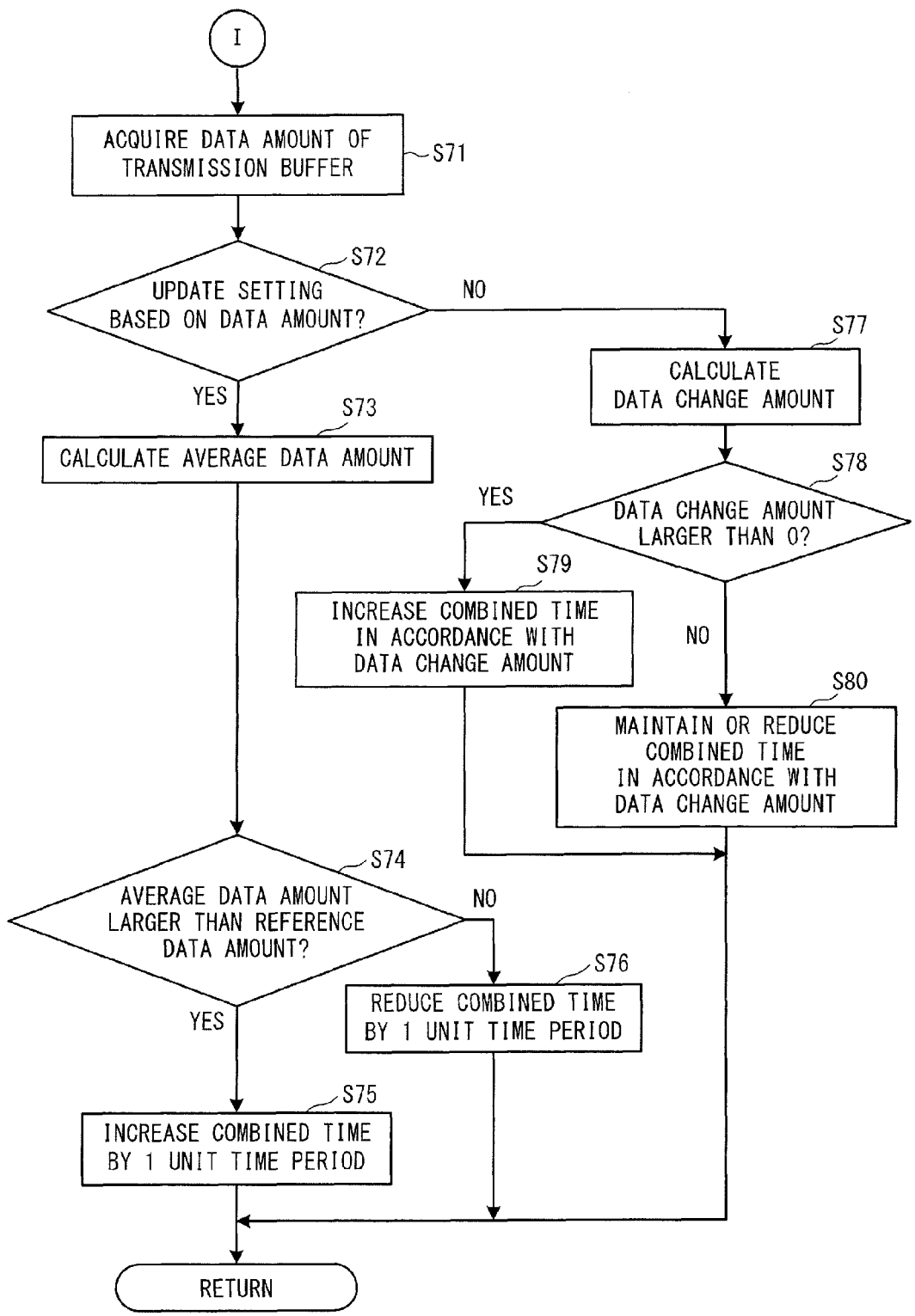
FIG. 7 is a flowchart of the combined time update processing in the sound data communication program, and is a continuation of FIG. 6.

Processing from step S71 to step S80 that will be described below is the same as the above-described processing from step S57 to step S70 (refer to FIG. 6) except that the processing from step S71 to step S80 does not involve transmission via the transmission buffer of the relay server 6. As shown in FIG. 7, the CPU 31 acquires the data amount of the compressed sound data stored in the transmission buffer that corresponds to the transmission target terminal 3 (step S71). The CPU 31 adds the acquired time to the acquired data amount and stores the updated data in the RAM 33. The CPU 31 determines, in the settings in relation to the operations of the sound data communication program, whether the setting to update the combined time based on the data amount of the transmission buffer has been set, or the setting to update the combined time based on a data change amount of the transmission buffer has been set (step S72).

In a case where the setting to update the combined time based on the data amount has been set (yes at step S72), with respect to the data amount of the transmission buffer stored in the RAM 33 at step S71, the CPU 31 calculates an average data amount that is an average value of the data amounts for the past three seconds (step S73). The CPU 31 determines whether or not the average data amount is larger than the reference data amount (step S74). In a case where the average data amount is larger than the reference data amount (yes at step S74), the CPU 31 increases the combined time of the compressed sound data by one unit time period (step S75). In a case where the average data amount is not larger than the reference data amount (no at step S74), the CPU 31 reduces the combined time of the compressed sound data by one unit time period (step S76). The CPU 31 ends the combined time update processing and returns the processing to the main routine of the sound data communication program.

In a case where the setting to update the combined time based on the data change amount has been set (no at step S72), the CPU 31 calculates a data change amount for the past three seconds based on the data amounts of the transmission buffer stored in the RAM 33 at step S71 (step S78). The CPU 31 sets the combined time in accordance with the data change amount, and thus controls the data amount of the compressed sound data that is accumulated in the transmission buffer to be maintained constant (step S78 to step S80). The processing from step S78 to step S80 is the same as the above-described processing from step S68 to step S70 shown in FIG. 6, and an explanation thereof is thus omitted here. The CPU 31 ends the combined time update processing and returns the processing to the main routine of the sound data communication program.

Figure 8:
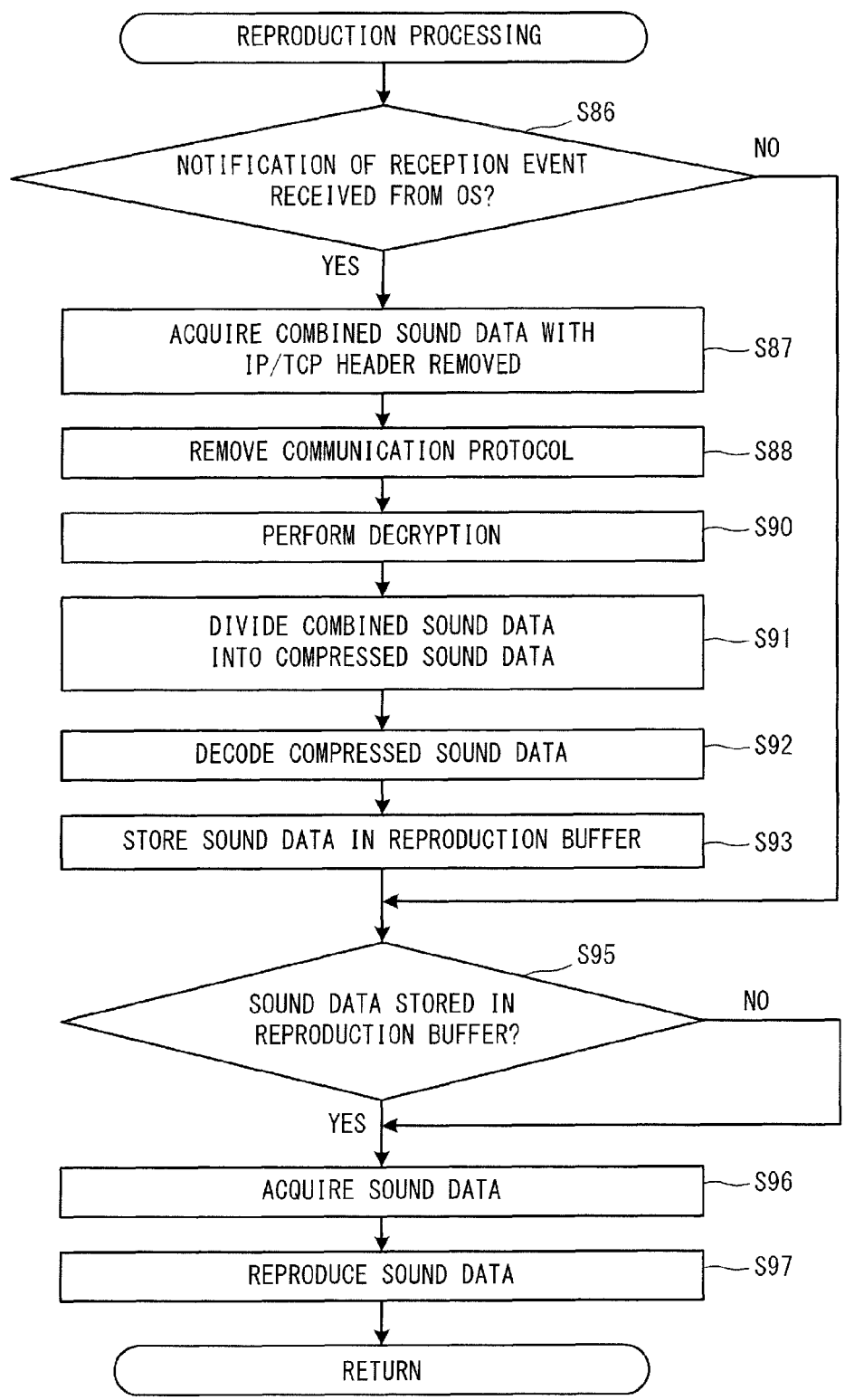
FIG. 8 is a flowchart of reproduction processing in the sound data communication program.

As shown in FIG. 4, after the combined time update processing (step S55), the CPU 31 performs a subroutine of reproduction processing (step S85). As shown in FIG. 8, the CPU 31 determines whether or not a notification of a reception event has been received (step S86). When the CPU 31 receives the combined sound data from the other terminal 3 via the network 8, the CPU 31 stores the combined sound data in a receiving socket buffer after removing the IP/TCP header, and notifies the reception event to the sound data communication program, in accordance with the OS. In the execution of the sound data communication program, in a case where the notification of the reception event has not been received (no at step S86), the CPU 31 advances the processing to step S95. In a case where the notification of the reception event has been received (yes at step S86), the CPU 31 acquires, from the receiving socket buffer, the combined sound data from which the IP/TCP header has been removed (step S87). The CPU 31 removes the header of the communication protocol from the acquired combined sound data (step S88), and performs decryption in accordance with the algorithm specified by the encryption header (step S90), thus obtaining the combined sound data to which the additional information has been added.

Based on the information of the combined time that is included in the additional information, the CPU 31 divides the combined sound data into one or more pieces of the compressed sound data each corresponding to one unit time period (step S91). Note that, in a case where the combined time is 5 ms (in a case where the combined number is 1), the CPU 31 directly takes the combined sound data as a single piece of the compressed sound data. The CPU 31 decodes the compressed sound data using a known decoder (step S92), stores the obtained sound data in the reproduction buffer of the RAM 33 (step S93), and advances the processing to step S95. The CPU 31 determines whether or not the sound data that has not yet been reproduced is stored in the reproduction buffer (step S95). In a case where the sound data that has not yet been reproduced is not stored in the reproduction buffer (no at step S95), the CPU 31 ends the reproduction processing, returns the processing to the main routine of the sound data communication program, and advances the processing to step S99. In a case where the sound data that has not yet been reproduced is stored in the reproduction buffer (yes at step S95), the CPU 31 retrieves the sound data that has not yet been reproduced from the reproduction buffer in an order of storage (step S96), and transmits the retrieved sound data to the speaker 45 (step S97). The speaker 45 performs D/A conversion on the received sound data and outputs the D/A converted sound data, thus reproducing audio. The CPU 31 ends the reproduction processing, returns the processing to the main routine of the sound data communication program, and advances the processing to step S99.

As shown in FIG. 4, in a case where an operation to exit from the conference room is received from the input portion 42, or in a case where a conference end notification, which is transmitted from the conference server 1 based on the end request, is received, the CPU 31 ends the remote conference (yes at step S99) and ends the execution of the sound data communication program. In a case where the remote conference is continued (no at step S99), the CPU 31 returns the processing to step S27 and repeatedly performs the processing from step S27 to step S99. In this manner, the CPU 31 transmits the sound data to the other terminal 3 that is participating in the remote conference, and reproduces the sound data received from the other terminal 3.

As described above, the CPU 31 of the terminal 3 executes the sound data communication program, and changes the combined time of the compressed sound data in accordance with a change of the bandwidth in the network 8. It is thus possible to suppress a delay in the transmission of the sound data and to inhibit packet loss.

Figure 9:
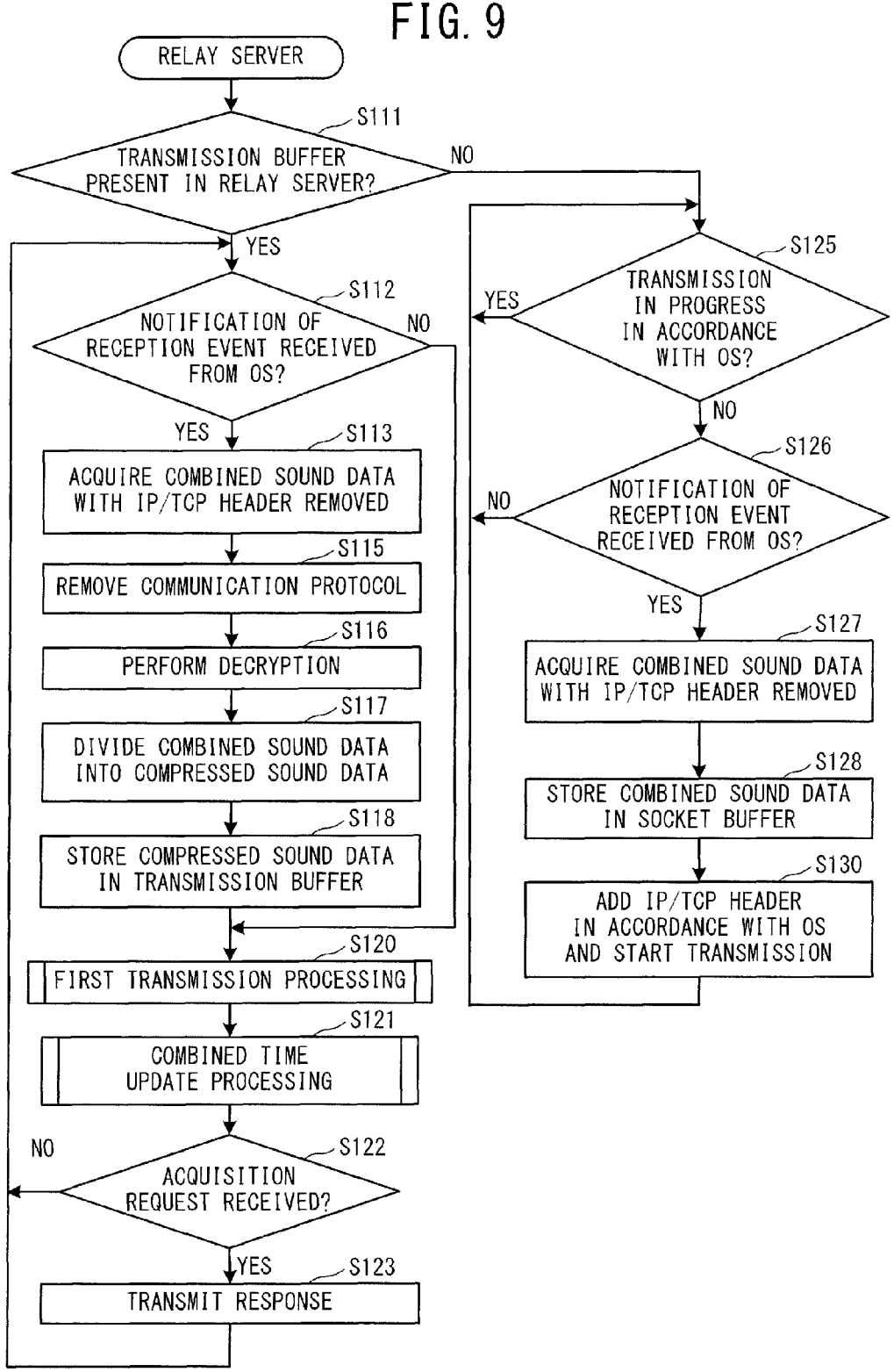
FIG. 9 is a flowchart of a relay program that is executed by a relay server.

Next, operations when the CPU 61 of the relay server 6 executes the relay program and relays the sound data that is transmitted and received between the terminals 3 will be explained with reference to FIG. 9. For example, when the OS is started up, based on the settings performed by a server administrator, the CPU 61 of the relay server 6 reads the relay program from the HDD 67 and automatically executes the relay program. The CPU 61 connects to the conference server 1, and notifies the conference server 1 of the network address, the path information on the network 8 to connect to the conference server 1, and the fact that the relay server 6 is caused to function as a server to relay data transfer in the remote conference, thus causing the notified information to be registered in the database. With respect to the operations of the relay server 6, one of the following two settings can be set in advance for the relay program. One is a setting in which data transfer is performed using the transmission buffer, and the other is a setting in which the data transfer is performed without using the transmission buffer. In a case where it is set that data transfer is performed using the transmission buffer, the CPU 61 secures a storage area for the transmission buffer in the RAM 63, notifies the conference server 1 that there is the transmission buffer, and causes the notified information to be registered in the database.

In a case where there is the transmission buffer (yes at step S111), the CPU 61 of the relay server 6 determines whether or not a notification of a reception event has been received (step S112). In a case where the combined sound data has been received from the terminal 3 or the other relay server 6 via the network 8, the CPU 61 stores the combined sound data in a receiving socket buffer after removing the IP/TCP header, and notifies the reception event to the relay program, in accordance with the OS. In a case where the notification of the reception event has not been received (no at step S112), the CPU 61 advances the processing to step S120. In a case where the notification of the reception event has been received (yes at step S112), the CPU 61 acquires, from the receiving socket buffer, the combined sound data from which the IP/TCP header has been removed (step S113). The CPU 61 removes the header of the communication protocol from the combined sound data from which the IP/TCP header has been removed (step S115), and performs decryption in accordance with the algorithm specified by the encryption header (step S116), thus obtaining the combined sound data to which the additional information has been added. The CPU 61 divides the combined sound data based on the information of the combined time included in the additional information, and acquires one or more pieces of the compressed sound data each corresponding to one unit time period (step S117). The CPU 61 stores the compressed sound data in the transmission buffer (step S118) and advances the processing to step S120.

The CPU 61 performs a subroutine of first transmission processing (step S120). The first transmission processing in the relay program is similar to the first transmission processing (FIG. 5) in the sound data communication program that is executed by the CPU 31 of the terminal 3. More specifically, the CPU 61 retrieves, from the transmission buffer, one or more pieces of the compressed sound data for the combined number that corresponds to the combined time, and combines the one or more pieces of the compressed sound data, thus generating the combined sound data. The CPU 61 adds additional information to the combined sound data, performs encryption, and adds the protocol header. The CPU 61 stores the combined sound data in the transmission socket buffer. The CPU 61 outputs a transmission request that instructs the OS to transmit the combined sound data. In accordance with the OS, the CPU 61 adds, to the combined sound data, the IP/TCP header that specifies, as the transmission destination, the network address of the transmission target terminal 3 or the relay server 6 that is located next on the path, and starts the transmission.

After the first transmission processing, the CPU 61 performs a subroutine of combined time update processing (step S121). The combined time update processing in the relay program is the same processing as the combined time update processing (FIG. 6 and FIG. 7) in the sound data communication program that is executed by the CPU 31 of the terminal 3. In other words, the CPU 61 updates the combined time based on a data amount or a data change amount of the compressed sound data temporarily stored in the transmission buffer. In a case where another relay server 6 is located on the path to the transmission target terminal 3, based on whether or not the other relay server 6 has the transmission buffer, the CPU 61 performs update processing of the combined time based on the data amount or the data change amount of the compressed sound data.

After the combined time update processing, the CPU 61 determines whether or not the acquisition request has been received (step S122). As described above, the acquisition request is transmitted by the CPU 31 of the terminal 3 in order to query the data amount of the transmission buffer of the relay server 6. In a case where the acquisition request has been received (yes at step S122), the CPU 61 acquires the data amount of the compressed sound data stored in the transmission buffer that is provided corresponding to the terminal 3 that is designated as a transmission target by the terminal 3 that has transmitted the acquisition request. The CPU 61 notifies, as a response, the acquired data amount of the transmission buffer to the terminal 3 that has transmitted the acquisition request (step S123), and returns the processing to step S112. Also in a case where the acquisition request has not been received (no at step S122), the CPU 61 returns the processing to step S112. After that, the CPU 61 repeatedly performs the processing from step S112 to step S123, and relays the sound data that is transmitted and received between the terminals 3 that are participating in the remote conference, while changing the combined time of the compressed sound data in accordance with a change of the bandwidth in the network 8.

In a case where it is set in the relay program that data transfer is performed without using the transmission buffer and the CPU 61 determines that there is no transmission buffer in the determination processing at step S111 (no at step S111), the CPU 61 advances the processing to step S125. The CPU 61 determines whether or not processing for transmitting data in accordance with the OS is in progress (step S125). In a case where the data transmission is in progress (yes at step S125), in order to continue the data transmission that is in progress, the CPU 61 returns the processing to step S125 and shifts to a standby state. In a case where the data transmission is not in progress (no at step S125), the CPU 61 determines whether or not the notification of the reception event has been received from the OS (step S126). In a case where the notification of the reception event has not been received (no at step S126), the CPU 61 returns the processing to step S125 and shifts to the standby state. In a case where the notification of the reception event has been received (yes at step S126), through the processing that is performed in accordance with the OS, the CPU 61 acquires, from the receiving socket buffer, the combined sound data from which the IP/TCP header has been removed (step S127), and stores the combined sound data in the transmission socket buffer (step S128). The CPU 61 outputs a transmission request that instructs the OS to transmit the combined sound data. In accordance with the OS, the CPU 61 adds, to the combined sound data, the IP/TCP header that specifies, as the transmission destination, the network address of the transmission target terminal 3 or the relay server 6 that is located next on the path, and starts the transmission (step S130). The CPU 61 returns the processing to step S125. After that, the CPU 61 repeatedly performs the processing from step S125 to step S130, and thus relays the sound data that is transmitted and received between the terminals 3 that are participating in the remote conference.

If jitter occurs in the network 8 or the bandwidth becomes narrower, it takes a longer time for the CPU 31 of the terminal 3 to complete the transmission of a piece of the combined sound data to the other terminal 3. Therefore, the data amount of the compressed sound data stored in the transmission buffer may increase. In the present embodiment, in accordance with the execution of the sound data communication program, the CPU 31 changes the combined time of the compressed sound data in accordance with the data amount of the transmission buffer, and thus can adjust the data amount of the combined sound data to be transmitted in a single transmission. In a case where the data amount of the transmission buffer is larger than the reference data amount, the data amount of the compressed sound data stored in the transmission buffer tends to increase. In this case, the CPU 31 increases the combined time of the compressed sound data by one unit time period, and thus can reduce the number of times of transmission of the combined sound data. Consequently, the CPU 31 can reduce the data amount of the headers and the like that are necessary to transmit each piece of the combined sound data, in accordance with the reduced number of times of transmission. Therefore, the CPU 31 can reduce the data amount without changing the encoding conditions at the time of generating the compressed sound data. As a result, the CPU 31 can transmit the combined sound data to the other terminal 3 while inhibiting packet loss by narrowing the necessary bandwidth, and can reduce the data amount of the transmission buffer.

In a case where the data amount of the transmission buffer is not larger than the reference data amount, the bandwidth that is necessary for data transmission in the network 8 is already secured by the CPU 31. In this case, the CPU 31 can increase the number of times of transmission of the combined sound data, by reducing the combined time of the compressed sound data by one unit time period. By doing this, the other terminal 3 can obtain the sound data in a shorter unit of time. Therefore, in a relationship between the input of the sound data by the terminal 3 on the transmission side of the sound data and the output of the sound data by the other terminal 3 on the receiving side of the sound data, it is possible to secure smooth linearity with less distortion. Further, the smaller the data amount of the compressed sound data that is transmitted in a single transmission, the shorter the time that is required for the transmission side terminal 3 to combine the compressed sound data, the shorter the time that is required to transmit and receive the combined sound data, and the shorter the time that is required for the receiving side terminal 3 to decode and output the combined sound data. Therefore, the CPU 31 can reduce a delay time that is generated between a time at which the sound data is input in the transmission side terminal 3 and a time at which the sound data is output from the receiving side terminal 3s.

The terminal 3 can increase or reduce the combined time by the unit time period in accordance with a change in the data amount of the transmission buffer that is affected when jitter occurs or the bandwidth changes in the network 8. If jitter occurs or the bandwidth becomes narrow, the data amount of the transmission buffer increases. In this case, the terminal 3 reduces the necessary bandwidth by increasing the combined time by one unit time period so that the transmission can be performed smoothly, thus reducing the data amount of the transmission buffer. Further, when the data amount is reduced, the necessary bandwidth is secured. In this case, the terminal 3 reduces the combined time by one unit time period, and thus can secure linearity in the relationship between the input and the output of the sound data to be transmitted to the other terminal 3.

In a case where the data amount of the transmission buffer increases, the CPU 31 sets the combined time of a minimum combined number, from among the combined numbers that can cause the absolute value of the amount of data reduction of the headers and the like, which are removed by the combining of the compressed sound data, to be larger than the absolute value of the amount of data increase. In a case where the data amount of the transmission buffer decreases, the CPU 31 sets the combined time of a maximum combined number, from among the combined numbers that can cause the absolute value of the amount of data increase of the headers and the like, which are added by the dividing of the compressed sound data, to be larger than the absolute value of the amount of data reduction. Thus, the terminal 3 can maintain the data amount of the transmission buffer to be substantially constant. Thus, the terminal 3 can stably perform the transmission of the combined sound data to the other terminal 3 even if jitter occurs or the bandwidth changes in the network 8.

If jitter occurs or the bandwidth changes in the network 8, the data amount of the compressed sound data stored in the transmission buffer of the relay server 6 also changes. Therefore, the terminal 3 sets the combined time in accordance with a change in the total amount of the data amount of the transmission buffer of the terminal 3 and the data amount of the transmission buffer of the relay server 6. Thus, the terminal 3 can stably perform the transmission of the combined sound data to the other terminal 3.

Figure 10:
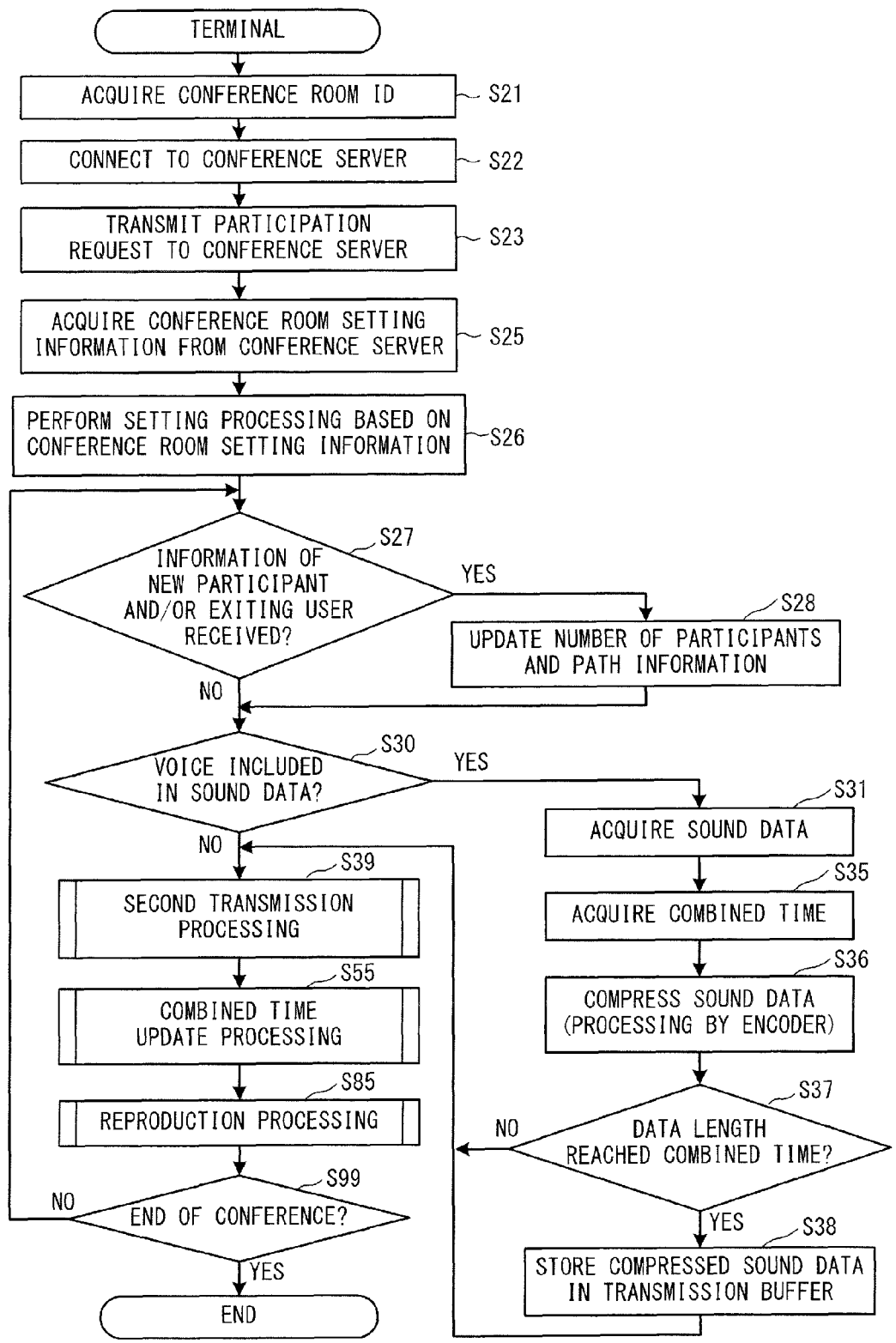
FIG. 10 is a flowchart of a sound data communication program according to another embodiment.
Figure 11:
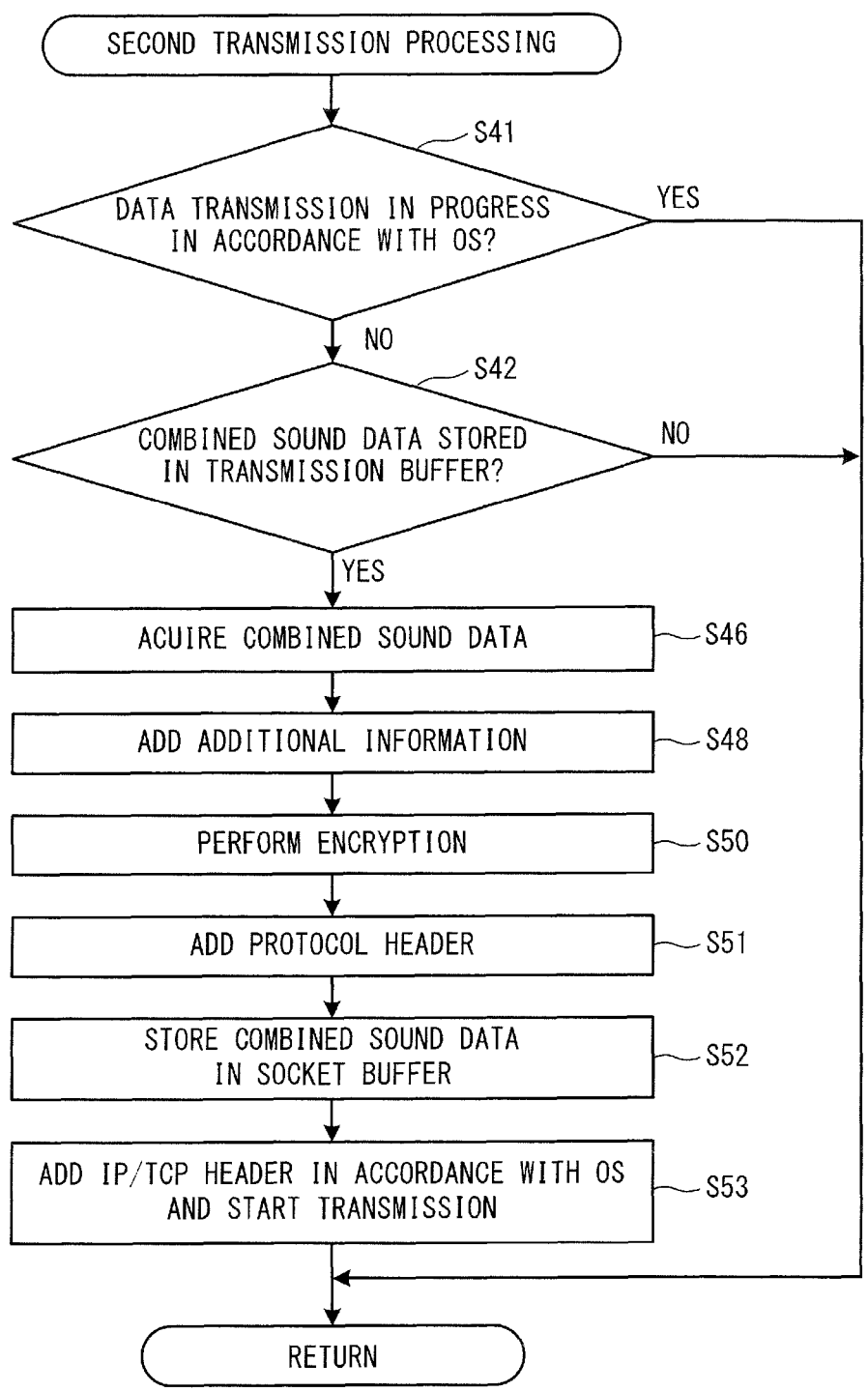
FIG. 11 is a flowchart of second transmission processing according to the other embodiment.

Next, another embodiment will be explained. The embodiment that will be explained below is different from the above-described embodiment in the process of compressing and combining the sound data, in the processing of the sound data communication program executed by the CPU 31 of the terminal 3. Specifically, as shown in FIG. 10, processing from step S35 to step S38 in the main routine of the sound data communication program of the present embodiment is different from the processing in the main routine of the sound data communication program shown in FIG. 4. Further, second transmission processing at step S39 in FIG. 10 is partially different from the first transmission processing at step S40 in FIG. 4. Specifically, as shown in FIG. 11, processing at step S46 in the second transmission processing of the present embodiment is different from the processing in the first transmission processing shown in FIG. 5. In the explanation below, the processing that is different from the above-described embodiment will be explained and the explanation of the same processing will be simplified or omitted. In flowcharts shown in FIG. 10 and FIG. 11, the same processing as that of the above-described embodiment is denoted by the same step numbers as the flowcharts shown in FIG. 4 and FIG. 5, respectively.

As shown in FIG. 10, in the processing at step S30 of the sound data communication program, in a case where voice is included in the sound data (yes at step S30), the CPU 31 of the terminal 3 according to the present embodiment acquires the sound data from the sound buffer of the RAM 33 (step S31). The CPU 31 acquires the combined time stored in the RAM 33 (step S35). The CPU 31 compresses the sound data using the known encoder for which the encoding conditions based on the default settings are set (step S36). The CPU 31 compresses the sound data until the length of the data reaches the combined time. In a case where the length of the data is less than the combined time (no at step S37), the CPU 31 advances the processing to step S39 and causes the processing of the main routine to proceed. The CPU 31 repeatedly performs the processing from step S27 to step S99 in the main routine, while the compression processing of the sound data by the encoder is continued. In a case where the length of the data reaches the combined time (yes at step S37), the CPU 31 obtains the combined sound data that is the compressed sound data having the length that corresponds to the combined time. The CPU 31 stores the combined sound data in the transmission buffer of the RAM 33 (step S38) and advances the processing to step S39.

The CPU 31 performs a subroutine of the second transmission processing (step S39). As shown in FIG. 11, in the second transmission processing of the present embodiment, in a case where the combined sound data is stored in the transmission buffer that corresponds to the transmission target terminal 3 (yes at step S42), the CPU 31 acquires the combined sound data from the transmission buffer (step S46). The processing after step S46 is the same as that of the above-described embodiment. Specifically, the CPU 31 adds the additional information (step S48), performs encryption (step S50), and adds the protocol header (step S51) to the combined sound data. The CPU 31 stores the combined sound data in the transmission socket buffer (step S52). The CPU 31 outputs a transmission request that instructs the OS to transmit the combined sound data. In accordance with the OS, the CPU 31 adds the IP/TCP header to the combined sound data (step S52) and starts the transmission (step S53).

As described above, in the present embodiment, when the sound data is processed and compressed by the encoder, the CPU 31 generates the combined sound data having the length that is based on the combined time. Since the CPU 31 performs the encoding of the sound data to the generation of the combined sound data in one process, it is possible to reduce the time that is necessary to process the sound data for transmission. It is thus possible to reduce a delay time that is generated between the time at which the sound data is input in the transmission side terminal 3 and the time at which the sound data is output from the receiving side terminal 3.

The present disclosure is not limited to the above-described embodiments, and various changes are possible. Any device can be used as the terminal 3 as long as the device is configured to execute the sound data communication program, to be connectable to the network 8, to collect audio by the microphone 43, and to output audio by the speaker 45. For example, the terminal 3 may be any type of personal computer, such as a laptop computer, a tower computer or a notebook computer. The terminal 3 may be a smart phone, a tablet type terminal or the like. The terminal 3 may incorporate the microphone 43 and the speaker 45. Further, the conference server 1 may be a multi-point control unit, and the terminal 3 may be a terminal dedicated to remote conferencing. The conference server 1 may also function as the relay server 6. The conference system 100 need not necessarily include the relay server 6. The conference system 100 need not necessarily include the conference server 1. In this case, a plurality of the terminals 3 may directly perform communication via the network 8 without going through the conference server 1.

In the above-described embodiments, the data amount of the compressed sound data corresponding to one unit time period is adopted as an example of the threshold value for the average data amount that is used in the processing at step S63. However, the threshold value is not limited to this example. For example, the threshold value may be a data amount of the compressed sound data corresponding to two or more unit time periods. The threshold value is not limited to the data amount corresponding to the unit time period and may be a data amount corresponding to a given time period. In the above-described embodiments, in the processing at step S64 and step S65, the CPU 31 increases or decreases the combined time by one unit time period at a time. However, the CPU 31 may increase or decrease the combined time by two or more unit time periods at a time. In the above-described embodiments, in the processing at step S69 and S70, the CPU 31 updates the combined time based on a data change amount. However, for example, the terminal 3 may store, in the HDD 37, a table that is created in advance based on the graph shown in FIG. 3. In this case, in a case where the data amount is increasing, the CPU 31 may calculate a speed of an increase in the data amount over a specified time period in the processing at step S67. The CPU 31 may refer to the table and obtain the combined time for which it is possible to reduce a bandwidth that is larger than the data increase speed. This also applies to a case in which the data amount is decreasing.

In the above-described embodiments, in the processing at step S61 or step S73, the past three seconds is used as an example of the period over which the average value of the data amount is obtained. However, the period over which the average value is obtained is not limited to this example, and may be the past 0.5 seconds or two seconds or a given time period. This also applies to the data change amount that is used at step S67 or step S78. In the combined time update processing based on the data amount, the CPU 31 need not necessarily use the average value of the data amount. The data amount at a certain time may be used as it is. In a case where the data amount of the transmission buffer of the terminal 3 and the data amount of the transmission buffer of the relay server 6 are used, a sum of the respective data amounts at a certain time may be used as it is. Further, also in the combined time update processing based on the data change amount, in place of the average value of the data change amount of the transmission buffer of the terminal 3 and the data change amount of the transmission buffer of the relay server 6, a sum of the respective data change amounts may be used.

A general-purpose processor may be used as each of the CPU 11, the CPU 31 and the CPU 61. In the above-described embodiments, all of the processing that is performed by one of the CPU 11, the CPU 31 and the CPU 61 may be performed by another electronic component (for example, an application specific integrated circuit). Further, in the above-described embodiments, all of the processing that is performed by one of the CPU 11, the CPU 31 and the CPU 61 may be distributed and processed by a plurality of electronic devices (for example, a plurality of CPUs).

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A non-transitory computer-readable medium storing computer-readable instructions, the instructions, when executed by a processor of a device configured to be connectable to a network for participating in a remote conference, performing processes comprising:
    a first generation operation generating first sound data by compressing, in accordance with a pre-set compression parameter, sound data acquired via a microphone connected to the device;
    a storage operation storing the first sound data in an order of generation in a storage device of the device;
    an acquisition operation acquiring a first value, the first value being defined based on a storage amount, the storage amount representing a total data amount of at least one piece of the first sound data stored in the storage device;
    a determination operation determining whether the first value is larger than a threshold value;
    a setting operation setting a total time to:
        a first total time in response to the determination operation determining that the first value is larger than the threshold value; and
        a second total time in response to the determination operation determining that the first value is not larger than the threshold value, the second total time being shorter than the first total time, wherein
    the total time corresponds to a total reproduction time of second sound data to be transmitted to another device via the network, the other device being configured to be connectable to the network for participating in the remote conference; and
    a second generation operation generating the second sound data by combining a specified number of pieces of the first sound data, the specified number of pieces of the first sound data being acquired from among the at least one piece of first sound data stored in the storage device, and the specified number of pieces of the first sound data corresponding to the total time.

2. The computer-readable medium according to claim 1, wherein
    the acquisition operation comprises:
    calculating a first change amount as the first value, the first change amount being based on a difference between a first storage amount and a second storage amount, the first storage amount being the storage amount acquired at a first time, and the second storage amount being the storage amount acquired at a second time after the first time.

3. The computer-readable medium according to claim 2, wherein
    the setting operation further comprises setting the total time to a value making
        an absolute value of a second change amount to be larger than an absolute value of the first change amount; and
        a difference between the absolute value of the second change amount and the absolute value of the first change amount being at a minimum, wherein
    the second change amount is a total amount of change in a data amount of a transmission header to be added to the second sound data, the change in the data amount being generated when a number of times of transmission of the second sound data in a predetermined period changes in accordance with the total time.

4. The computer-readable medium according to claim 1, wherein
    the computer-readable instructions, when executed by the processor, further perform processes comprising:
        a request transmission operation transmitting, to a relay device, a request signal querying a first storage amount, the relay device being configured to be connectable to the network and also being configured to relay the second sound data when the device transmits the second sound data to the other device via the network, the first storage amount representing a total data amount of the first sound data regenerated from the second sound data transmitted from the device, the first sound data being stored in a storage device of the relay device; and
        a reception operation receiving, in response to the transmission of the request signal, a response signal notifying the first storage amount from the relay device, and
    the first value is a value based on a sum of the storage amount acquired by the acquisition operation and the first storage amount received by the reception operation.

5. The computer-readable medium according to claim 1, wherein
    the acquisition operation comprises:
        acquiring the storage amount; and
        calculating the first value by averaging the storage amount for a predetermined period.

6. The computer-readable medium according to claim 1, wherein
    the computer-readable instructions, when executed by the processor, further perform processes comprising:
        a transmission instruction operation instructing transmission of the generated second sound data to the other terminal.

7. A non-transitory computer-readable medium storing computer-readable instructions, the instructions, when executed by a processor of a device configured to be connectable to a network for participating in a remote conference, performing processes comprising:
    a first generation operation generating first sound data by compressing, in accordance with a pre-set compression parameter, sound data acquired via a microphone connected to the device;
    a second generation operation generating second sound data by combining the first sound data having a time length corresponding to a total time proportional to a combined number of pieces of the first sound data, the total time corresponding to a total reproduction time of the second sound data to be transmitted to another device via the network, the other device being configured to be connectable to the network for participating in the remote conference;
    a storage operation storing the second sound data in a storage device of the device;
    an acquisition operation acquiring a first value, the first value being defined based on a storage amount, the storage amount representing a data amount of the second sound data stored in the storage device;
a determination operation determining whether the first value is larger than a threshold value; and
a setting operation setting the total time to:
  a first total time in response to the determination operation determining that the first value is larger than the threshold value; and
  a second total time in response to the determination operation determining that the first value is not larger than the threshold value, the second total time being shorter than the first total time.

8. A device configured to be connectable to a network for participating in a remote conference, comprising:
a processor; and
a memory configured to store computer-readable instructions, the instructions, when executed by the processor, performing processes comprising:
  a first generation operation generating first sound data by compressing, in accordance with a pre-set compression parameter, sound data acquired via a microphone connected to the device;
  a storage operation storing the first sound data in an order of generation in a storage device of the device;
  an acquisition operation acquiring a first value, the first value being defined based on a storage amount, the storage amount representing a total data amount of at least one piece of the first sound data stored in the storage device;
  a determination operation determining whether the first value is larger than a threshold value;
  a setting operation setting a total time to:
    a first total time in response to the determination operation determining that the first value is larger than the threshold value; and
    a second total time in response to the determination operation determining that the first value is not larger than the threshold value, the second total time being shorter than the first total time, wherein
  the total time corresponds to a total reproduction time of second sound data to be transmitted to another device via the network, the other device being configured to be connectable to the network for participating in the remote conference; and
  a second generation operation generating the second sound data by combining a specified number of pieces of the first sound data, the specified number of pieces of the first sound data being acquired, from among the at least one piece of first sound data stored in the storage device, and the specified number of pieces of the first sound data corresponding to the total time.

9. The device according to claim 8, wherein
the acquisition operation comprises:
calculating a first change amount as the first value, the first change amount being based on a difference between a first storage amount and a second storage amount, the first storage amount being the storage amount acquired at a first time, and the second storage amount being the storage amount acquired at a second time after the first time.

10. The device according to claim 9, wherein
the setting operation further comprises setting the total time to a value making:
  an absolute value of a second change amount to be larger than an absolute value of the first change amount; and
  a difference between the absolute value of the second change amount and the absolute value of the first change amount being at a minimum, wherein
the second change amount is a total amount of change in a data amount of a transmission header to be added to the second sound data, the change in the data amount being generated when a number of times of transmission of the second sound data in a predetermined interval changes in accordance with the total time.

11. The device according to claim 8, wherein
the computer-readable instructions, when executed by the processor, further perform processes comprising:
  a request transmission operation transmitting, to a relay device, a request signal querying a first storage amount, the relay device being configured to be connectable to the network and also being configured to relay the second sound data when the device transmits the second sound data to the other device via the network, the first storage amount representing a total data amount of the first sound data regenerated from the second sound data transmitted from the device, the first sound data being stored in a storage device of the relay device; and
  a reception operation receiving, in response to the transmission of the request signal, a response signal notifying the first storage amount from the relay device, and
the first value is a value based on a sum of the storage amount acquired by the acquisition operation and the first storage amount received by the reception operation.

12. The device according to claim 8, wherein
the acquisition operation comprises:
  acquiring the storage amount; and
  calculating the first value by averaging the storage amount for a predetermined period.

13. The device according to claim 8, wherein
the computer-readable instructions, when executed by the processor, further perform processes comprising:
a transmission instruction operation instructing transmission of the generated second sound data to the other terminal.

* * * * *